US012766934B2

(12) United States Patent
Norian et al.

(10) Patent No.: US 12,766,934 B2
(45) Date of Patent: Oct. 20, 2026

(54) HINGED COVER FOR PICKUP TRUCK BED

(71) Applicant: Infonet Corp., Altoona, IA (US)

(72) Inventors: Randy Norian, Daytona Beach, FL (US); Albert Marasco, Altoona, IA (US); Jeremy Throop, Altoona, IA (US)

(73) Assignee: Infonet Corp., Altoona, IA (US)

( * ) Notice: Subject to any disclaimer, the term of this patent is extended or adjusted under 35 U.S.C. 154(b) by 303 days.

(21) Appl. No.: 18/594,546

(22) Filed: Mar. 4, 2024

(65) Prior Publication Data

US 2024/0300312 A1 Sep. 12, 2024

Related U.S. Application Data

(60) Provisional application No. 63/488,870, filed on Mar. 7, 2023.

(51) Int. Cl.
*B60J 7/16* (2006.01)

(52) U.S. Cl.
CPC .................................. *B60J 7/1621* (2013.01)

(58) Field of Classification Search
CPC .............................. B60J 7/1621; B60J 7/1607
See application file for complete search history.

(56) References Cited

U.S. PATENT DOCUMENTS

| | | | |
|---|---|---|---|
| 3,764,177 A | 10/1973 | Woodward | |
| 5,127,701 A | 7/1992 | Miller | |
| 5,141,277 A | 8/1992 | Alexander | |
| 5,365,994 A | 11/1994 | Wheatley et al. | |
| 5,655,809 A * | 8/1997 | Hutchinson ................ | B60J 7/04 296/100.03 |
| 6,007,137 A | 12/1999 | Lambden | |
| 6,309,006 B1 | 10/2001 | Rippberger | |
| 6,427,500 B1 * | 8/2002 | Weinerman ......... | E05D 11/1071 296/100.1 |
| 6,497,445 B1 * | 12/2002 | Combs, II ................ | B60J 7/198 296/100.06 |

(Continued)

OTHER PUBLICATIONS

Hertz Furniture. Printed Sep. 10, 2023. https://www.hertzfurniture.com/steel-lockers--3-wide-two-person-locker-- 8739--mo.html?srsltid=AfmBOor1YbdH69Djmz2vf5GIxTOvzuJtbl_Zh1tWj6GxUg6P8tnqr5r6. 1 page.

*Primary Examiner* — Huan Le

(74) *Attorney, Agent, or Firm* — Vander Velden Law Firm, LLC; Melinda S. Vander Velden

(57) ABSTRACT

A hinged cover for enclosing the bed of a pickup truck. A front mount assembly comprises a generally rectangular front panel, generally triangular driver side panel extending rearwardly from a side of the generally rectangular front panel, and generally triangular passenger side panel extending rearwardly from an opposite side of the generally rectangular front panel. A first inner hinge plate mounts to the driver side panel and a second inner hinge plate mounts to the passenger side panel. A first outer hinge plate mounts to the first inner hinge plate. A second outer hinge plate mounts to the second inner hinge plate. A movable section configured to cover the bed is hingedly attached to front mount assembly via rods extending from the outer hinge plates and passing through a frame of the movable section. The movable section rotates about the rods between an open and closed positions.

11 Claims, 21 Drawing Sheets

(56) References Cited

U.S. PATENT DOCUMENTS

| | | | | |
|---|---|---|---|---|
| 6,505,875 | B1 | 1/2003 | Laper | |
| 6,582,006 | B1 | 6/2003 | Burch | |
| 6,641,200 | B2 | 11/2003 | Rusu | |
| 6,814,387 | B2 * | 11/2004 | Lake | B60J 7/1621 296/100.06 |
| 6,945,589 | B2 | 9/2005 | Quesenberry | |
| 7,594,478 | B2 | 9/2009 | Karnes et al. | |
| 8,182,020 | B2 | 5/2012 | Herndon | |
| 9,421,851 | B2 | 8/2016 | Kerr, III | |
| 9,688,127 | B2 | 6/2017 | Hemphill et al. | |
| 10,023,247 | B2 | 7/2018 | Diller et al. | |
| 10,189,510 | B1 | 1/2019 | Higgins | |
| 10,328,778 | B2 | 6/2019 | Aubrey et al. | |
| 11,091,928 | B2 | 8/2021 | Moller | |
| 2021/0331567 | A1 | 10/2021 | Selinger | |
| 2021/0354536 | A1 | 11/2021 | Moller | |

* cited by examiner

DETAIL B

DETAIL C

HINGED COVER FOR PICKUP TRUCK BED

CROSS REFERENCE TO RELATED APPLICATIONS

This application claims priority to U.S. Provisional Patent Application No. 63/488,870, filed on Mar. 7, 2023, the entirety of which is hereby incorporated herein by reference.

FIELD OF THE INVENTION

The disclosure relates generally to a covering for a truck bed. In particular, the disclosure relates to a hinged cover for a pickup truck bed.

BACKGROUND OF THE INVENTION

Current pickup bed toppers are typically fixed shells that clamp to the box of a pickup truck. Placing a larger item such as a bicycle into the bed of a pickup truck covered by a typical fixed topper requires crawling into the bed on hands and knees while simultaneously maneuvering the item into place. To make loading into a covered pickup bed easier, hinged covers for pickup truck beds have been suggested; however, such hinged covers have not been optimized to properly distribute the forces placed on the pickup truck or encountered by the cover itself. These forces can cause damage to the pickup truck and to the topper itself. These forces can also cause the movable top of a hinged topper to twist, causing further damage to pickup truck or topper, and making it difficult to align and close the topper. Therefore, an improved hinged cover for a pickup truck bed is desired.

SUMMARY OF THE INVENTION

In accordance with various embodiments of the invention, a hinged cover for a pickup truck bed is provided. In one embodiment, a hinged cover for a pickup truck bed comprises a front mount assembly attached to a pickup bed. The front mount assembly may comprise a base having a generally rectangular front panel that sits behind the truck cab, a triangular driver side panel attached to and extending rearwardly from the front panel on the driver side and generally perpendicular to the front panel, and a passenger side panel attached to and extending rearwardly from the front panel on the passenger side and generally perpendicular to the front panel. Seated within the base is a lower subframe section which may comprise a plurality of lengths of tubing, sheet metal, or fiberglass. An inner hinge plate connects to each of the driver side panel and the passenger side panel. An outer hinge plate connects to each inner hinge plate. A rod affixed to the driver side outer hinge plate and another rod affixed to the passenger side outer hinge plate extend into a movable section which hingedly attaches to the front mount assembly. Seated within the movable section is an upper frame section comprising a plurality of lengths of tubing, sheet metal, or fiberglass. The movable section comprises one or more roof panels, a driver side panel, a passenger side panel, a front panel, and a rear panel adhered to the upper frame section. Seated within the front panel of the movable section is a generally rectangular section of the upper frame. The rods affixed to the outer hinge plates will extend into the forwardmost tube of the moveable section. The movable section may be rotated about the rods to an open position that allows the bed of the pickup truck to be accessed, and the movable section may be rotated about the rods in the opposite direction to a closed position in which the bed of the truck is covered and the vehicle may be driven.

DETAILED DESCRIPTION OF THE INVENTION

Figure 1:
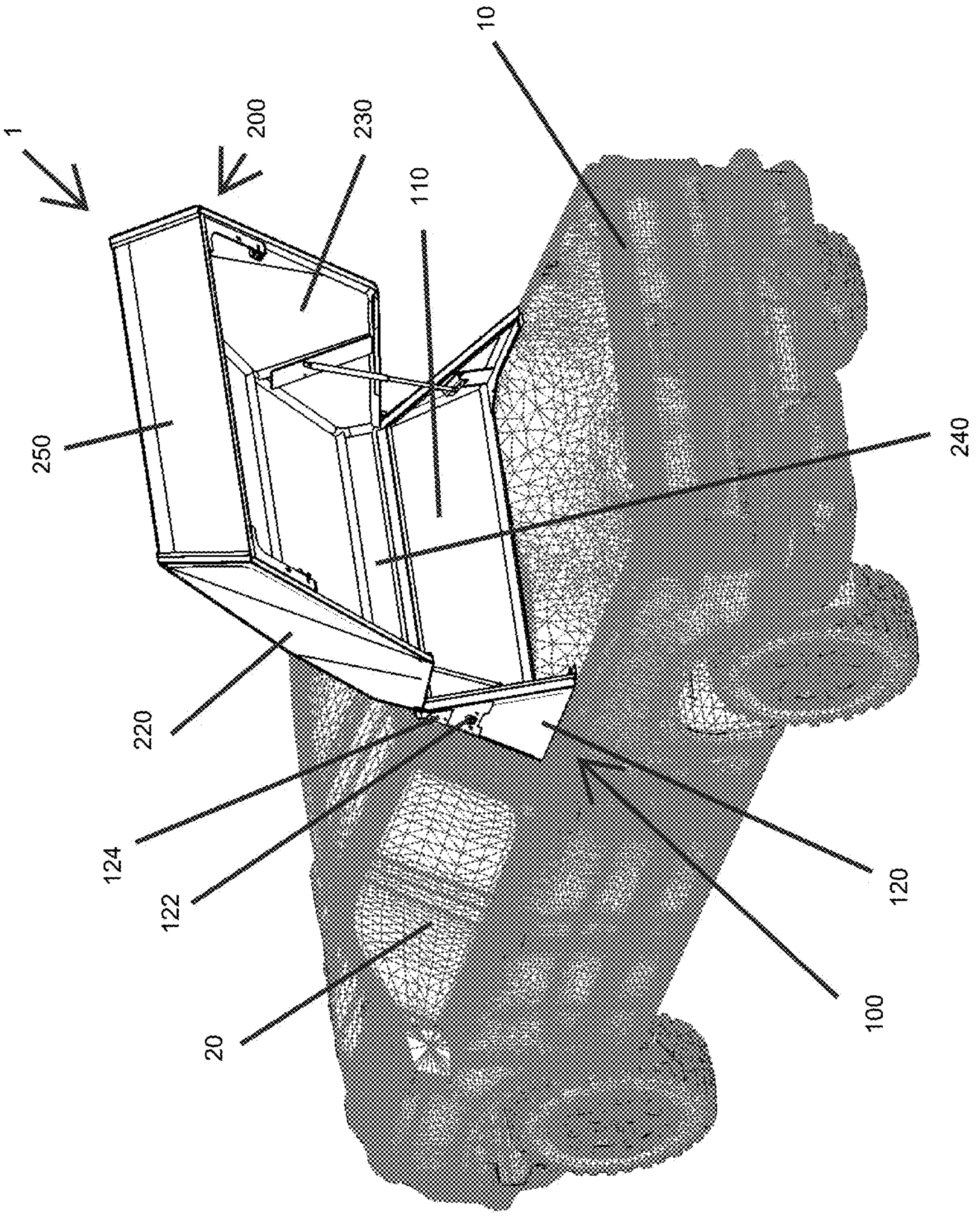
FIG. 1 illustrates a mounted hinged cover for a pickup truck bed in accordance with one embodiment of the invention.
Figure 2:
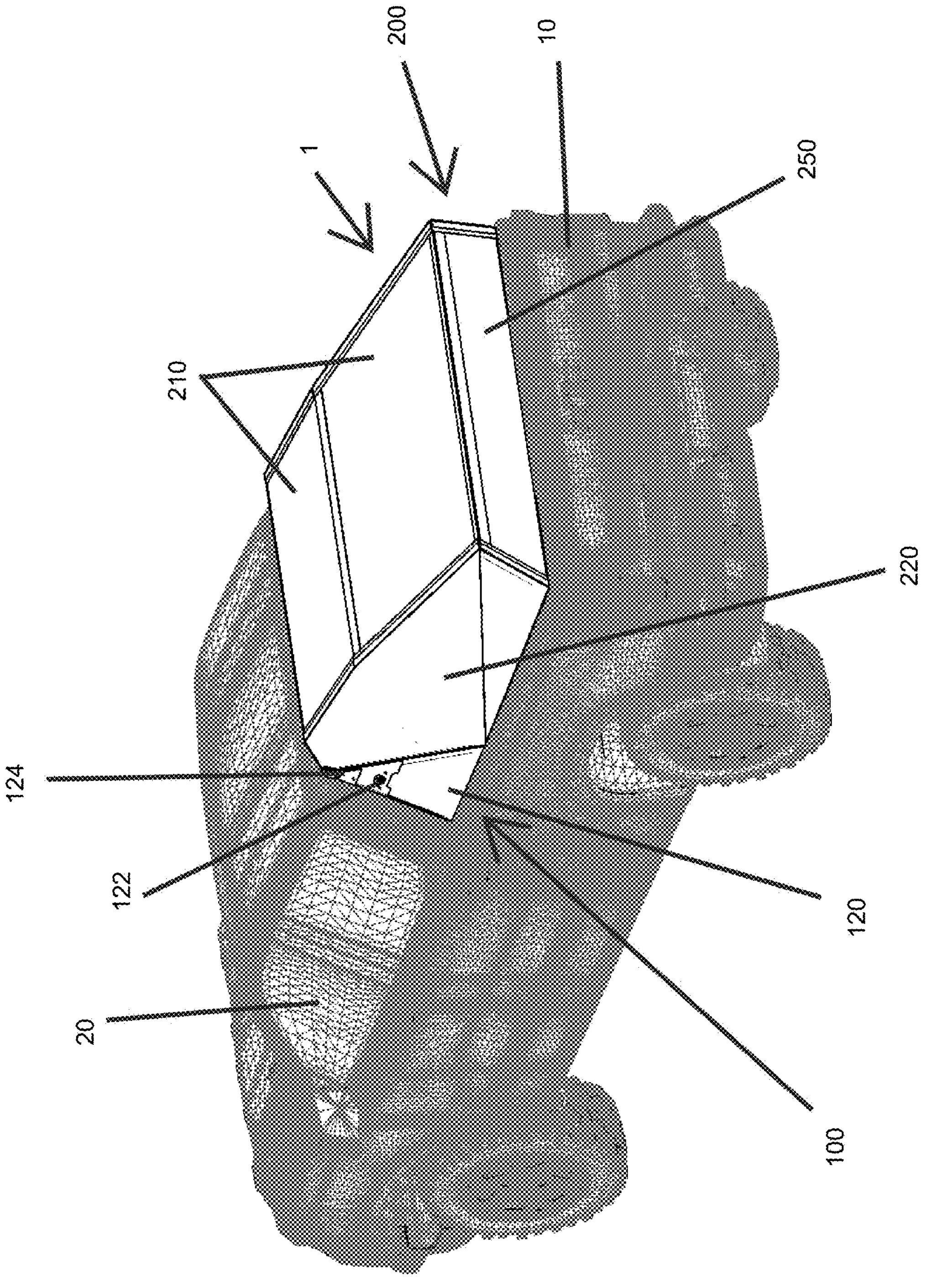
FIG. 2 illustrates a mounted hinged cover for a pickup truck bed in accordance with one embodiment of the invention.
Figure 3:
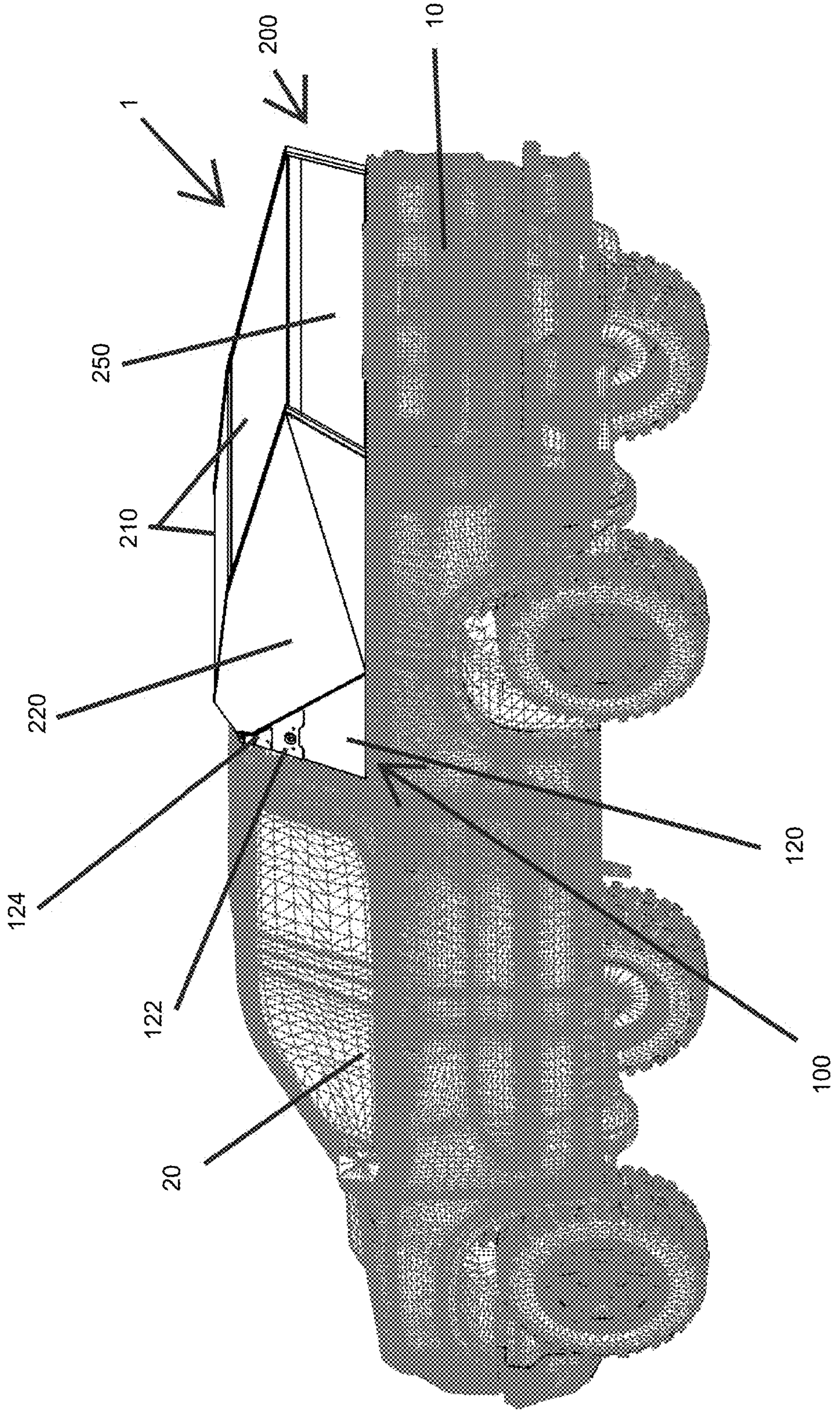
FIG. 3 illustrates a mounted hinged cover for a pickup truck bed in accordance with one embodiment of the invention.
Figure 4:
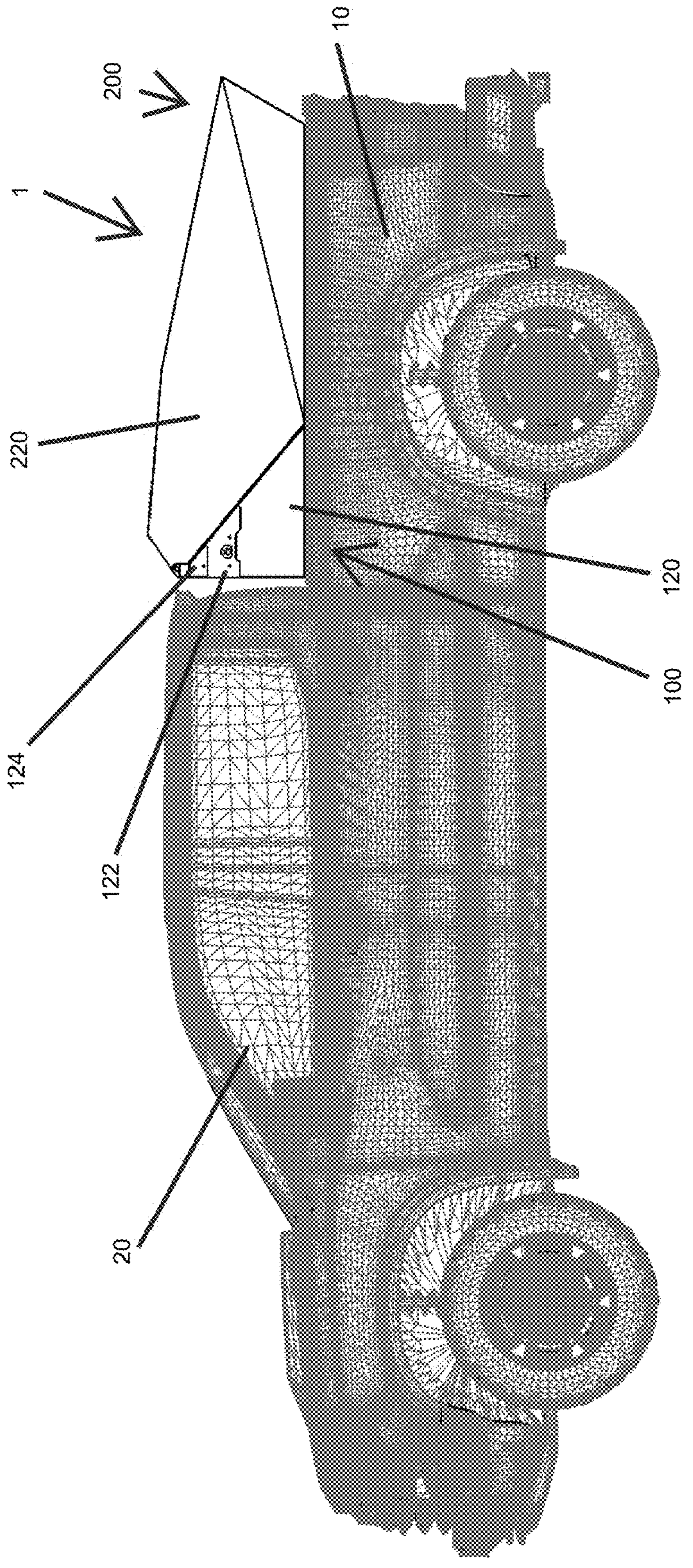
FIG. 4 illustrates a mounted hinged cover for a pickup truck bed in accordance with one embodiment of the invention.
Figure 5:
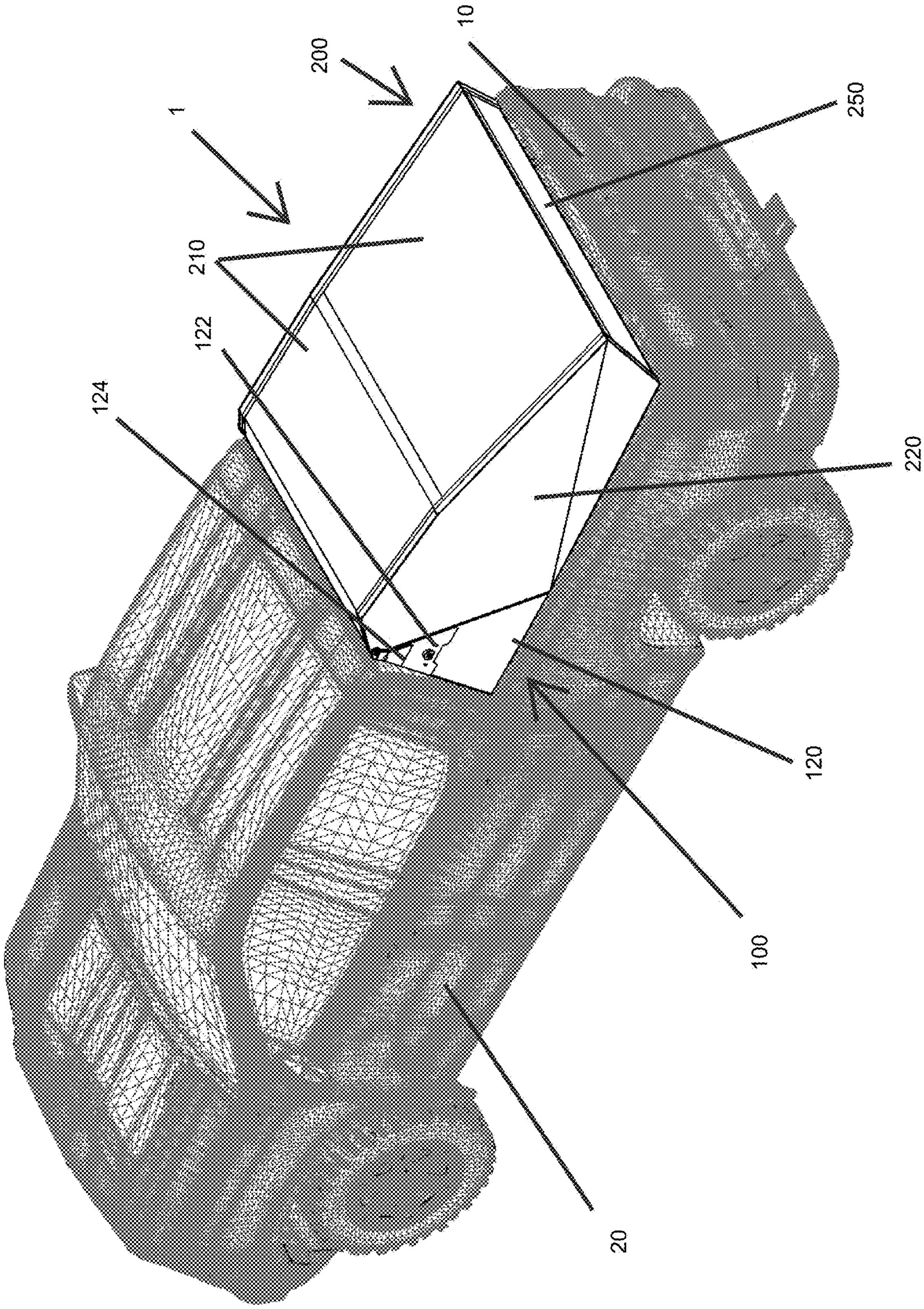
FIG. 5 illustrates a mounted hinged cover for a pickup truck bed in accordance with one embodiment of the invention.
Figure 6:
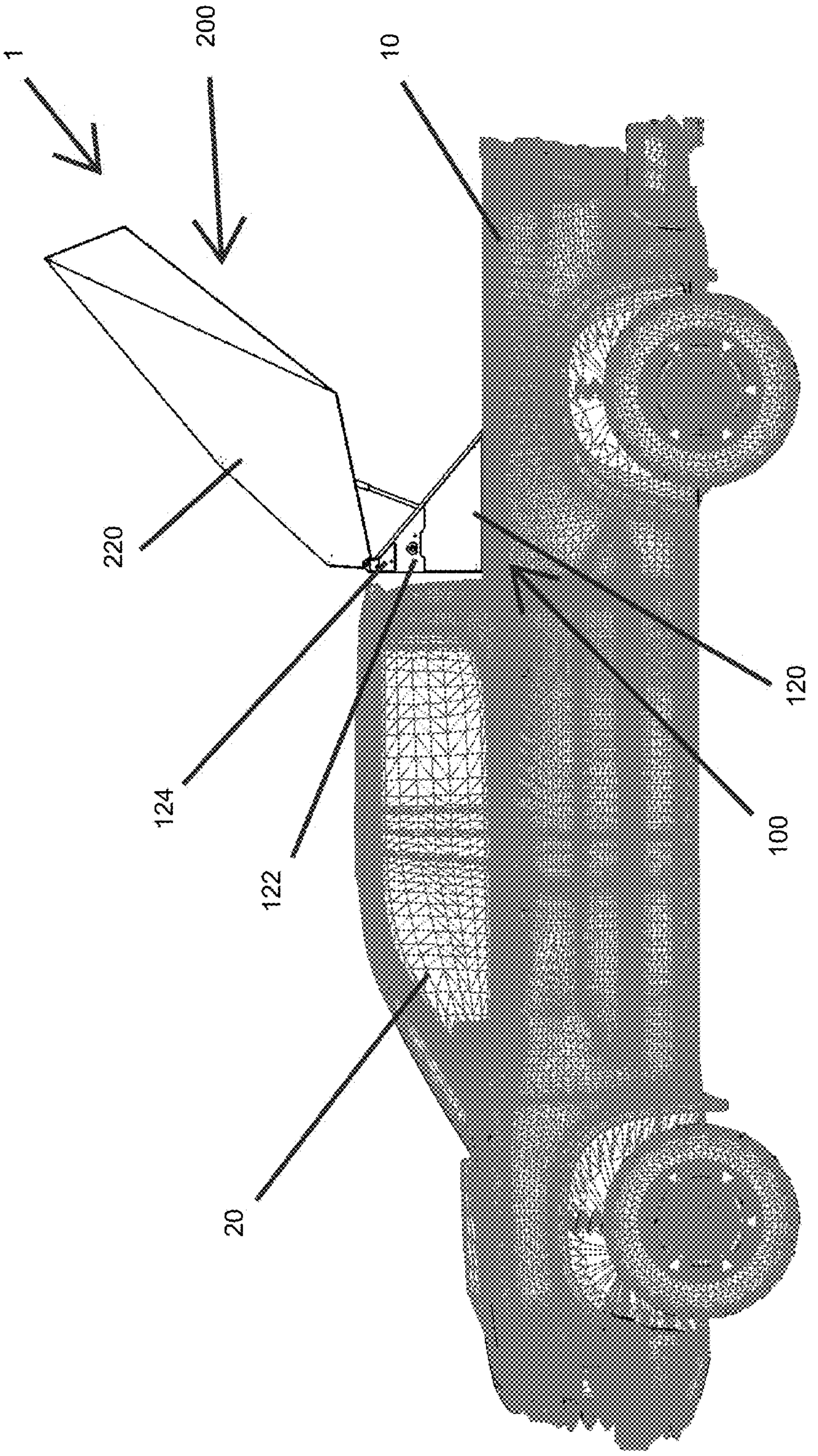
FIG. 6 illustrates a mounted hinged cover for a pickup truck bed in accordance with one embodiment of the invention.
Figure 7:
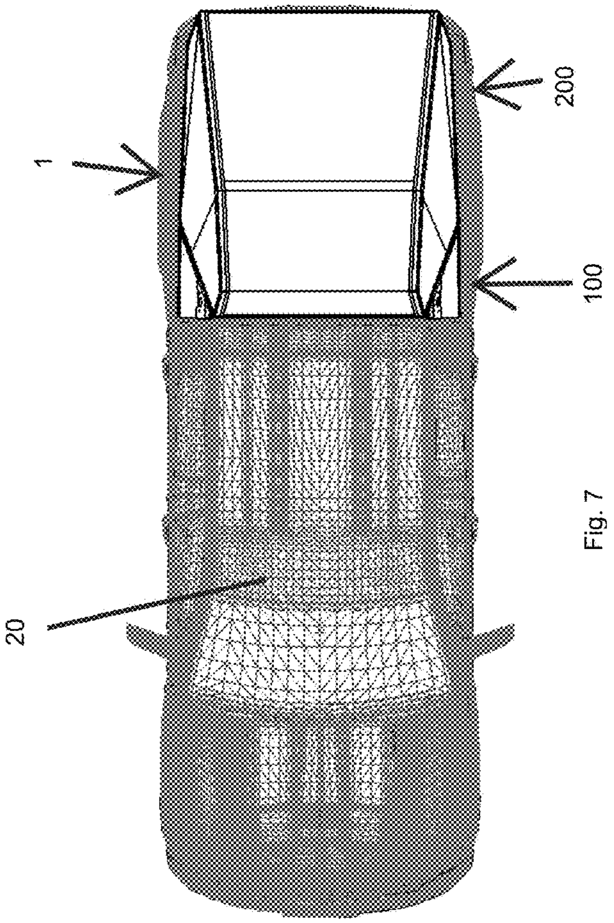
FIG. 7 illustrates a mounted hinged cover for a pickup truck bed in accordance with one embodiment of the invention.
Figure 8:
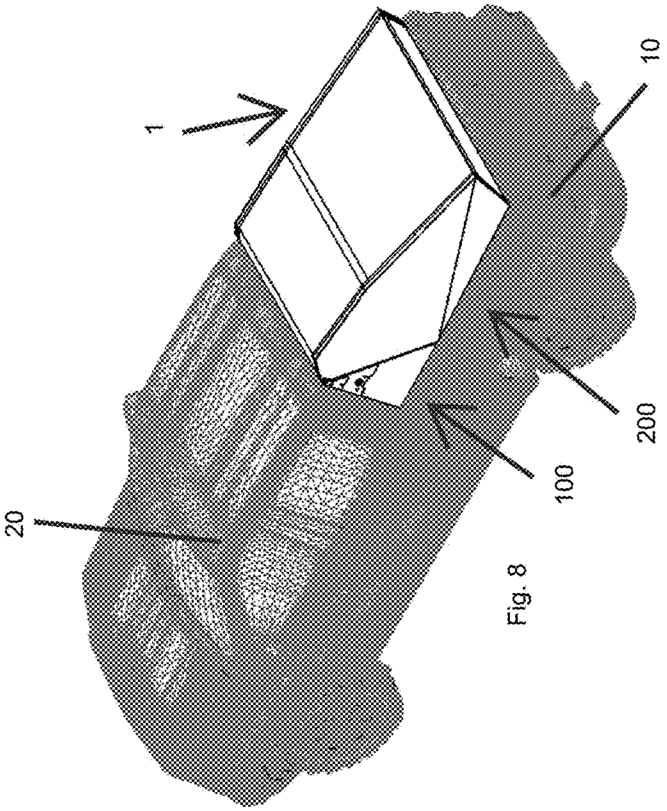
FIG. 8 illustrates a mounted hinged cover for a pickup truck bed in accordance with one embodiment of the invention.
Figure 9:
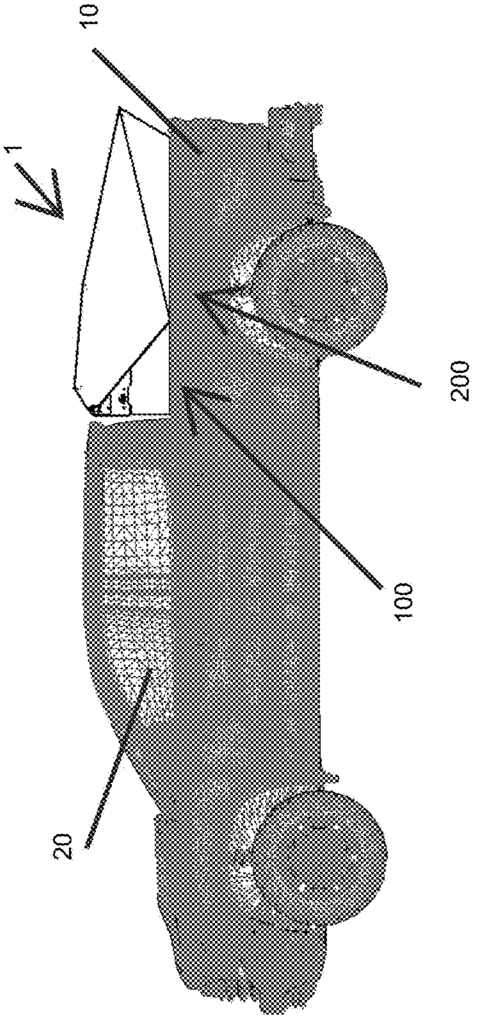
FIG. 9 illustrates a mounted hinged cover for a pickup truck bed in accordance with one embodiment of the invention.
Figure 10:
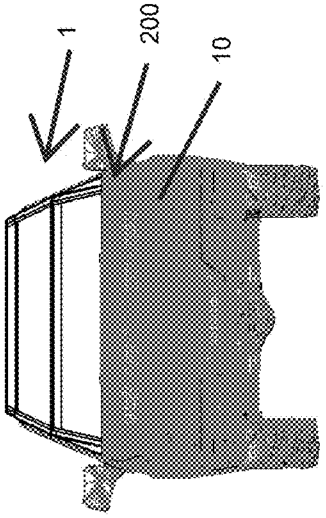
FIG. 10 illustrates a mounted hinged cover for a pickup truck bed in accordance with one embodiment of the invention.
Figure 11:
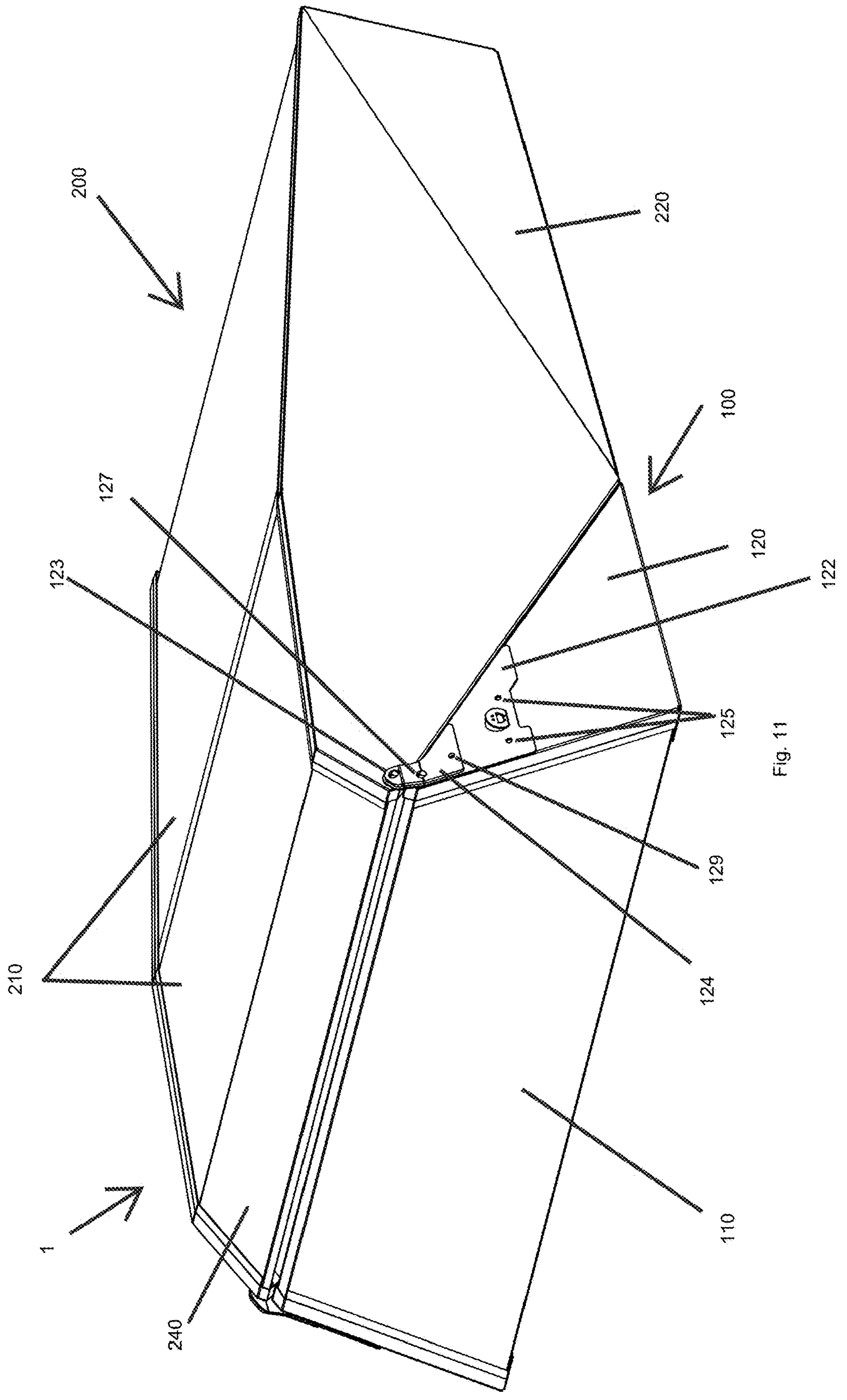
FIG. 11 illustrates a hinged cover for a pickup truck bed in accordance with one embodiment of the invention.
Figure 12:
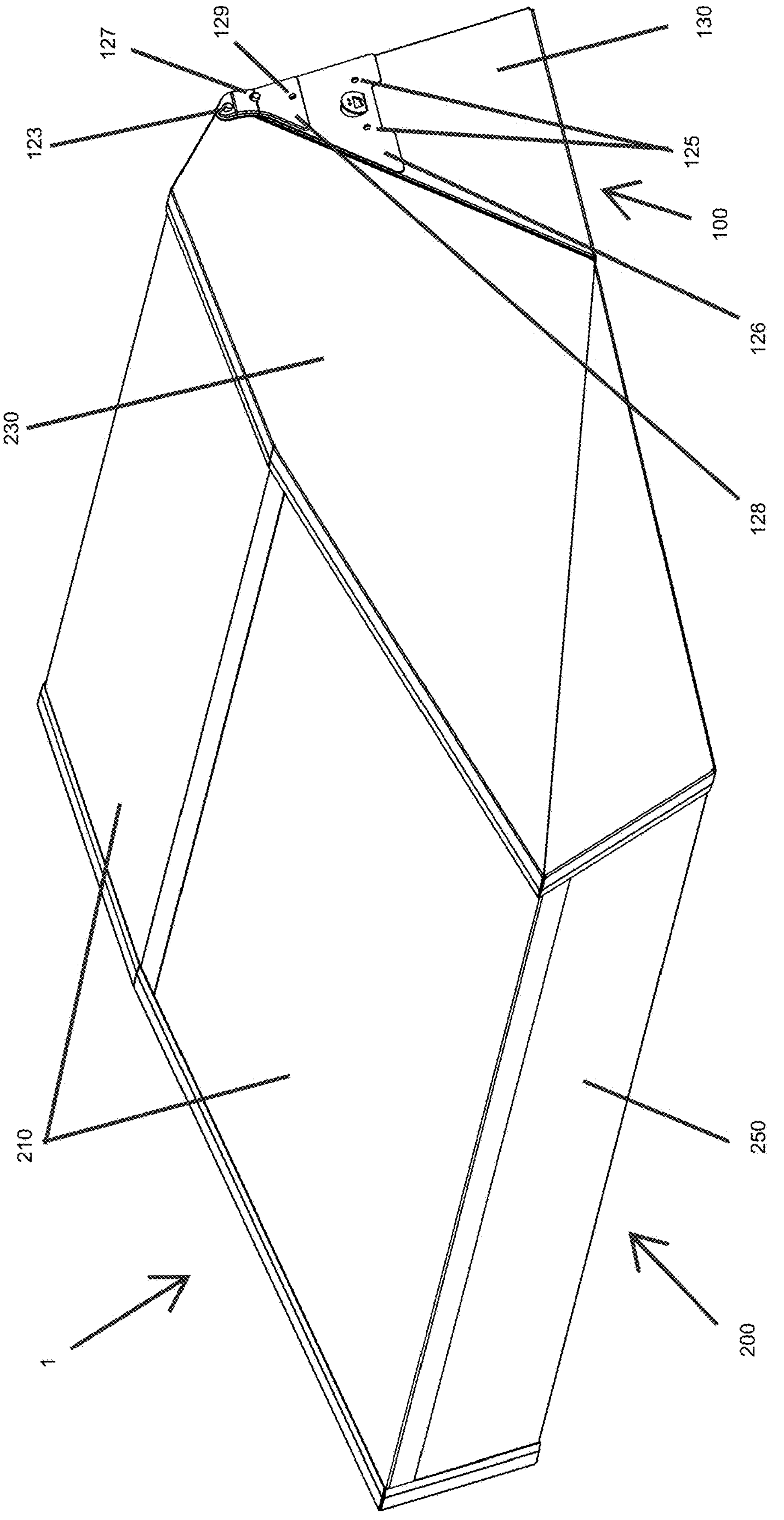
FIG. 12 illustrates a hinged cover for a pickup truck bed in accordance with one embodiment of the invention.
Figure 13:
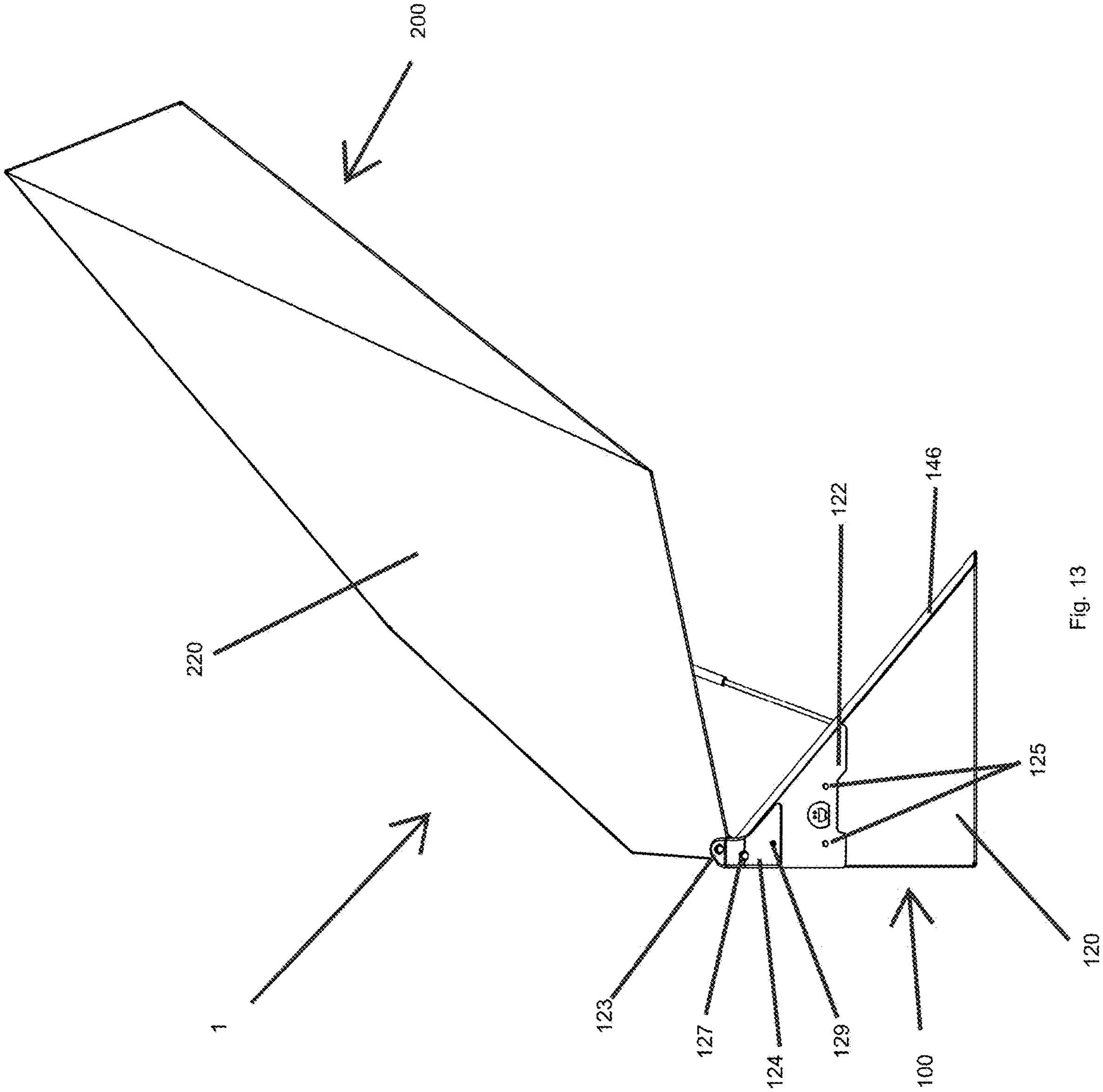
FIG. 13 illustrates a hinged cover for a pickup truck bed in accordance with one embodiment of the invention.
Figure 14:
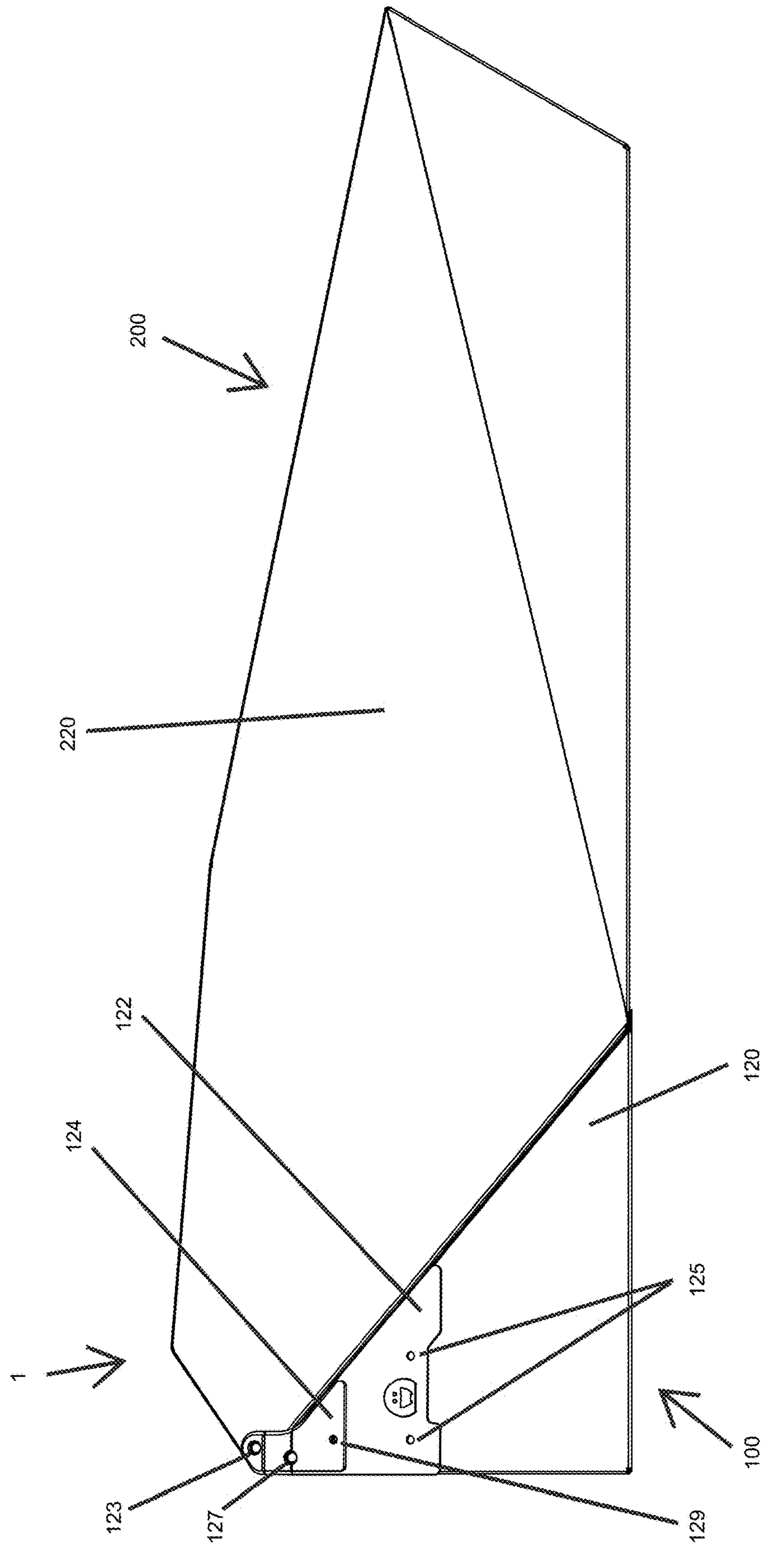
FIG. 14 illustrates a hinged cover for a pickup truck bed in accordance with one embodiment of the invention.
Figure 15:
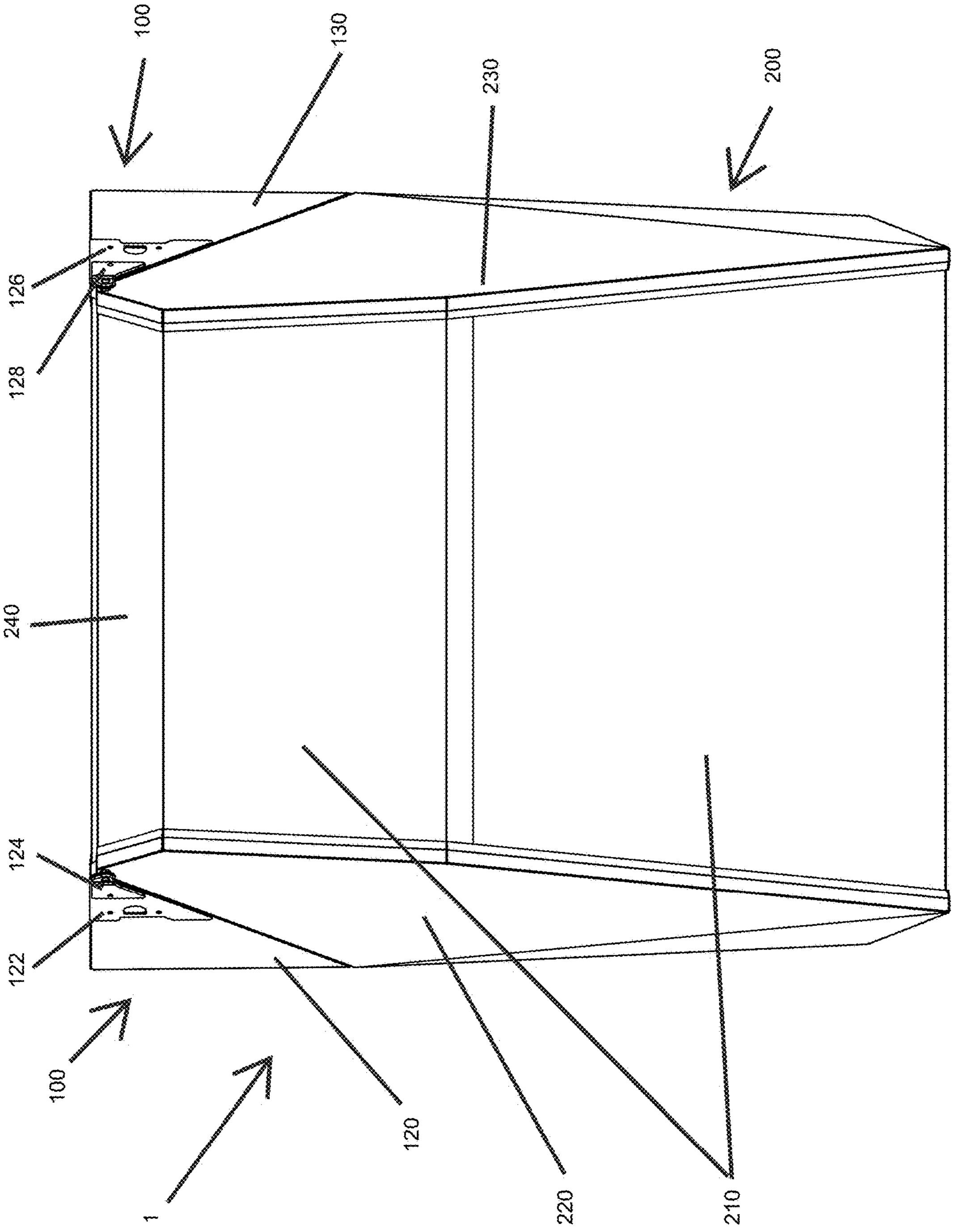
FIG. 15 illustrates a hinged cover for a pickup truck bed in accordance with one embodiment of the invention.
Figure 16:
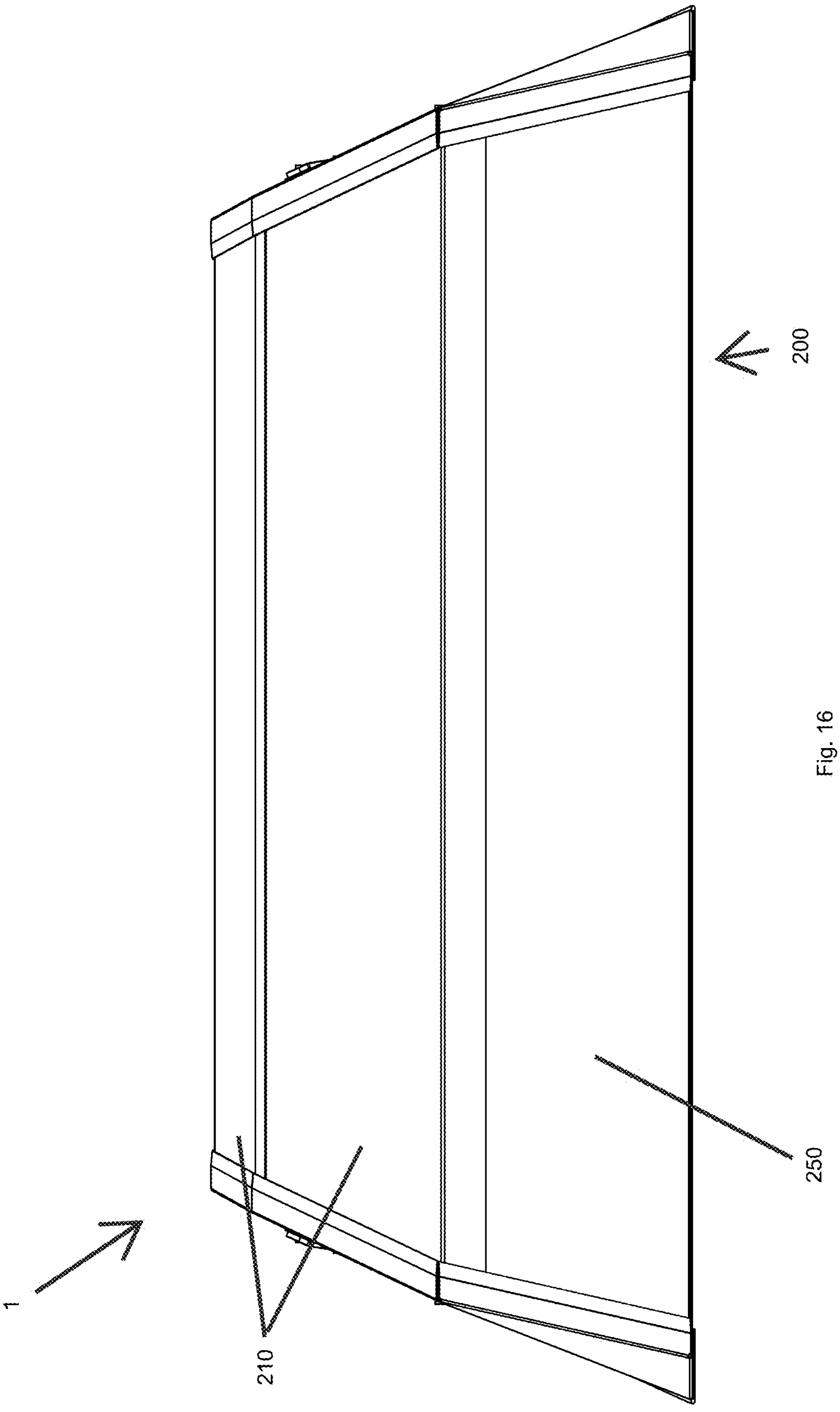
FIG. 16 illustrates a hinged cover for a pickup truck bed in accordance with one embodiment of the invention.
Figure 18:
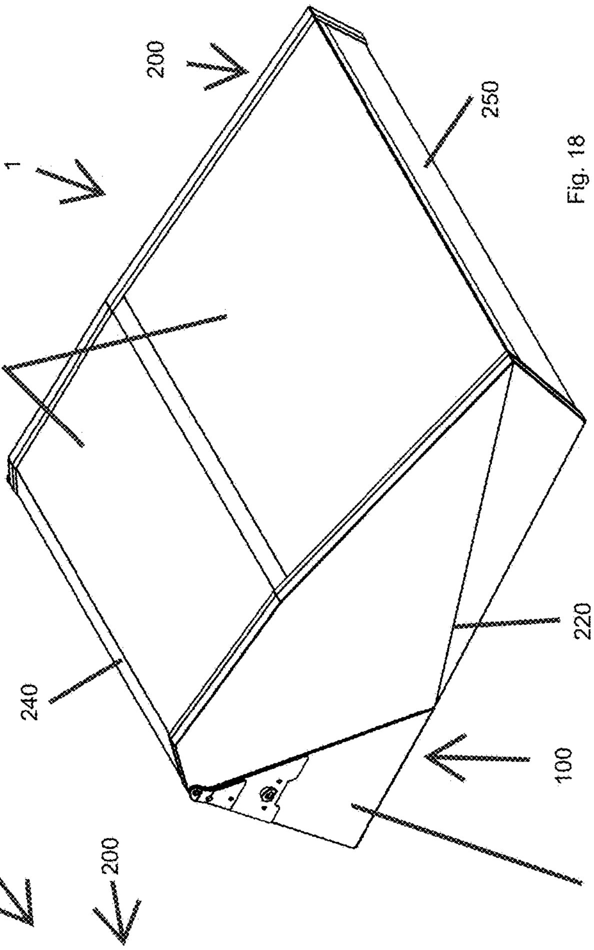
FIG. 18 illustrates a hinged cover for a pickup truck bed in accordance with one embodiment of the invention.
Figure 20:
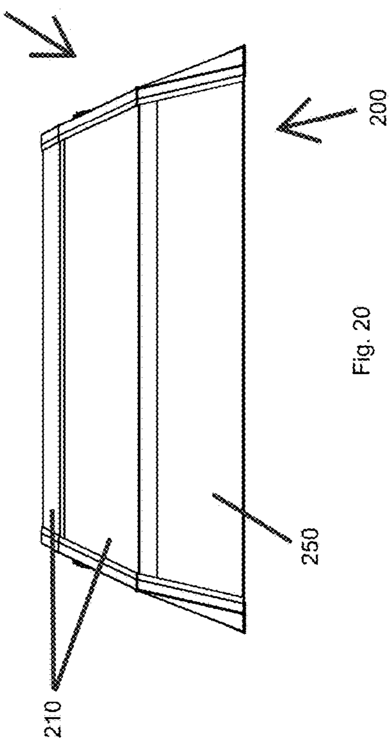
FIG. 20 illustrates a hinged cover for a pickup truck bed in accordance with one embodiment of the invention.
Figure 17:
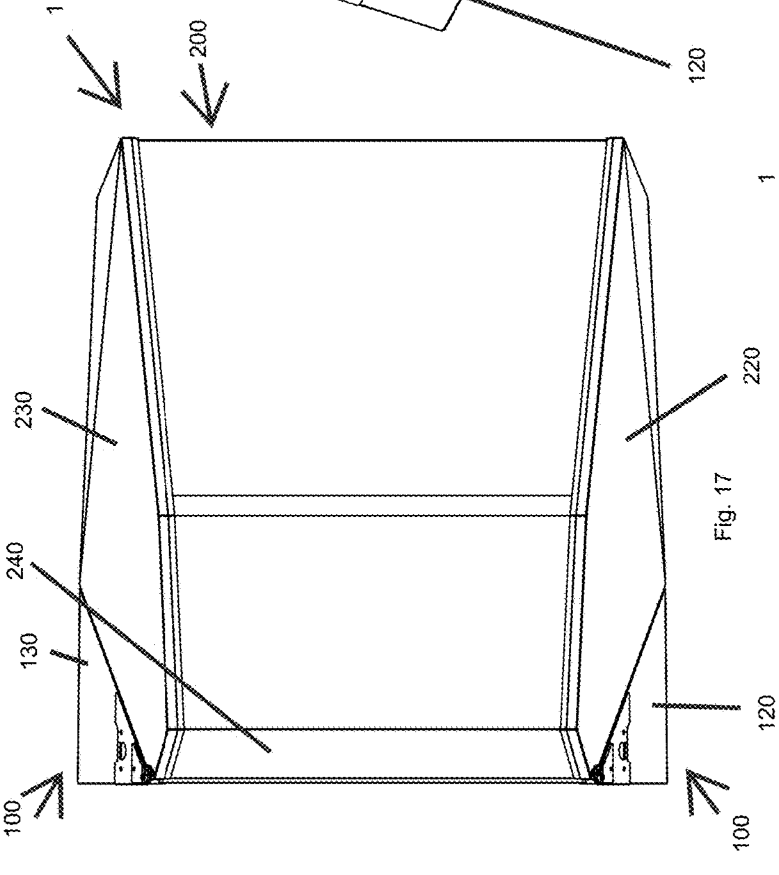
FIG. 17 illustrates a hinged cover for a pickup truck bed in accordance with one embodiment of the invention.
Figure 19:
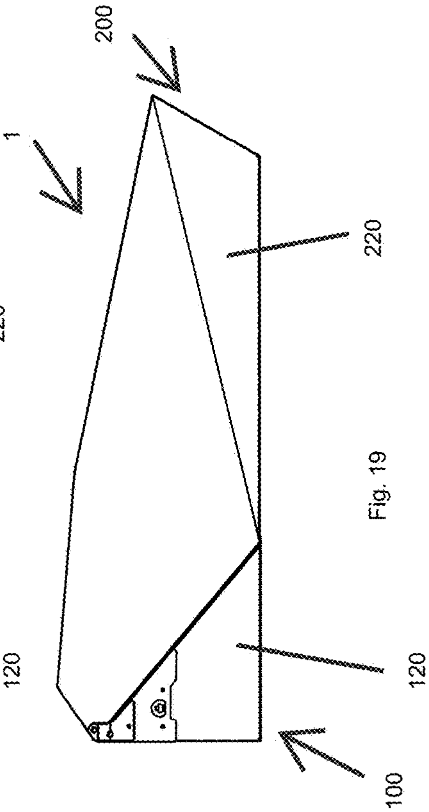
FIG. 19 illustrates a hinged cover for a pickup truck bed in accordance with one embodiment of the invention.
Figure 22:
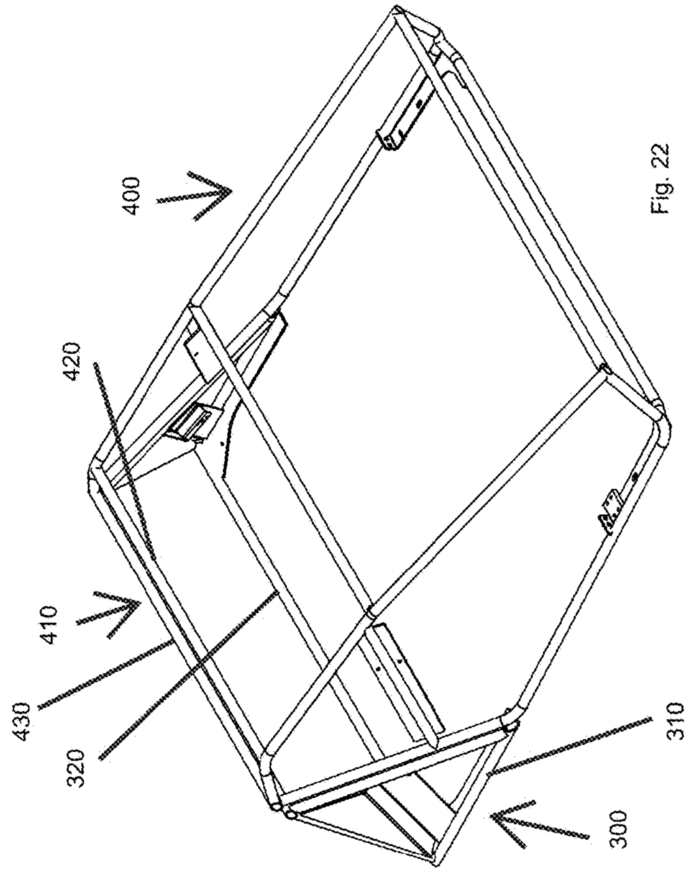
FIG. 22 illustrates a subframe of a hinged cover for a pickup truck bed in accordance with one embodiment of the invention.
Figure 24:
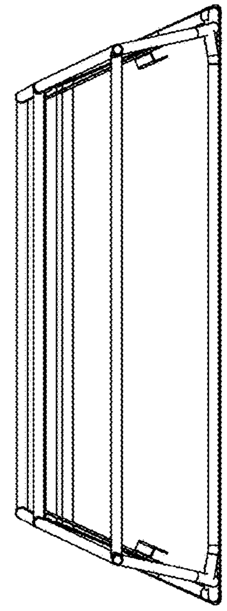
FIG. 24 illustrates a subframe of a hinged cover for a pickup truck bed in accordance with one embodiment of the invention.
Figure 21:
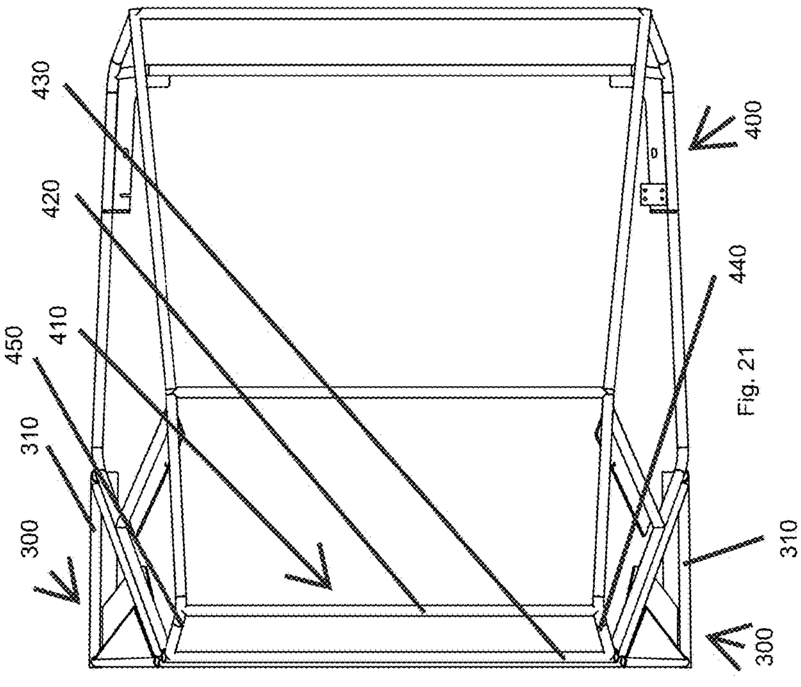
FIG. 21 illustrates a subframe of a hinged cover for a pickup truck bed in accordance with one embodiment of the invention.
Figure 23:
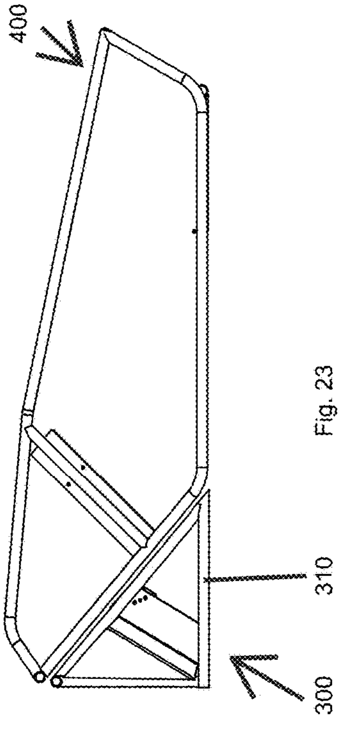
FIG. 23 illustrates a subframe of a hinged cover for a pickup truck bed in accordance with one embodiment of the invention.

Some embodiments of the present invention will now be described more fully hereinafter with reference to the accompanying drawings, in which some, but not all, embodiments of the invention are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the apparatus or method steps are not shown in one or more of the figures for clarity and to facilitate explanation of embodiments of the present invention.

In accordance with one embodiment, FIGS. 1-33 illustrate a hinged cover 1 for a pickup truck bed 10. The hinged cover 1 for a pickup truck bed 10 may alternatively be referred to as a hinged cover 1, cover 1, or topper 1 without departing from the scope of the disclosure. Hinged cover 1 is configured to be installed on top of the bed 10 of a pickup truck such that the hinged cover 1 encloses and covers the entire length and width of the bed 10. The hinged cover 1 may comprise a front mount assembly 100 configured to be attached to the pickup bed 10 to the rear of and adjacent to the cab 20 of the pickup truck. A movable section 200 hingedly attaches to the front mount assembly 100. Movable section 200 may be raised by rotating the movable section 200 about a rod. When movable section 200 is in its raised position, people and cargo can easily enter the bed 10. When movable section 200 is in its lowered position, cargo stored in the bed 10 is securely covered, and the truck on which the hinged cover 1 is installed may be driven.

Front Mount Assembly 100

As shown in FIGS. 27-30, a front mount assembly 100 comprises a front panel 110, a driver side panel 120 extending rearwardly from the front panel 110, and a passenger side panel 130 extending rearwardly from the front panel 110. Driver side panel 120 and passenger side panel 130 are generally symmetric, have generally the same dimensions, and are generally parallel to each other and generally perpendicular to front panel 110. Front mount assembly 100 is the stationary part of the hinged cover 1 that contacts and is secured to the pickup bed 10. The front mount assembly 100 also provides the structure for supporting the movable section 200, including the pivot point about which the movable section 200 rotates.

Front panel 110 may comprise a generally rectangular planar surface whose width extends from the driver side panel 120 to the passenger side panel 130 and whose height is generally equivalent to the distance between the top surface of the bed 10 and the height of the rearmost point of the cab 20. To add stability and to provide a surface for clamping the front mount assembly 100 to the pickup bed 10, the lower edge of front panel 110 may be folded inwardly and rearwardly at an approximately ninety degree angle relative to the rectangular planar surface of front panel 110. Similarly, the top edge of front panel 110 may be folded inwardly and rearwardly relative to the rectangular planar surface of front panel to form an upper flange 145 that diverts water off of hinged cover 1 and onto driver side flange 146 and passenger side flange 147, thus preventing water from entering the pickup bed 10. The upper flange 145 has sufficient height that water does not flow over the top of the upper flange 145, but instead flows outwardly and down driver side flange 146 and passenger side flange 147. A diverter may be installed at the lower end of driver side flange 146 and at the lower end of passenger side flange 147 to further divert water away from the hinged cover 1 and truck bed 10. When installed on a pickup truck, the folded portion of front panel 110 contacts and sits upon the front edge of the bed 10 just behind the cab 20.

Driver side panel 120 may comprise a generally triangular planar surface. The first side of the triangle that forms driver side panel 120 forms a base that, when installed on a pickup truck, contacts and sits upon the bed 10 of the pickup truck on the driver side at the front of the bed 10 just behind the cab 20. The length of the second side of the triangle that forms driver side panel 120 is generally equivalent to the distance between the top surface of the bed 10 and the height of the rearmost point of the cab 20. The first and second sides of the driver side panel 120 may meet at an approximately ninety degree angle. The second side of the driver side panel 120 connects to and shares a side with front panel 110 on the driver side of the pickup truck, and driver side panel 120 and front panel 110 are generally perpendicular to each other. The third side of the triangle that forms driver side panel 120 contacts movable section 200 when movable 200 is in its lowered position. To provide stability to driver side panel 120 and to assist with diverting water from hinged cover 1, the third side of the driver side panel 120 may fold inwardly at an approximately ninety degree angle relative to the triangular planar surface of driver side panel 120. The outermost edge of the folded portion of driver side panel 120 may be folded again upwardly, thus forming a driver side flange 146 that diverts water from the upper flange 145 and downward and away from pickup bed 10. Driver side flange 146 has sufficient height that water does not flow over the top of the driver side flange 146, but instead flows down and away from hinged cover 1 and truck bed 10. When closed, movable section 200 engages and rests upon the driver side flange 146 and the passenger side flange 147. For additional stability and to provide a surface for clamping the front mount assembly 100 to the pickup bed 10, the bottom or first side of the triangle of driver side panel 120 may also be folded inwardly at an approximately ninety degree angle. Driver side panel 120 may feature holes 121 near the top corner between the first and second sides of the triangle of driver side panel 120. The holes 121 allow for additional components of hinged cover 1 to be attached to driver side panel 120.

Similar to the driver side panel 120, the passenger side panel 130 may comprise a generally triangular planar surface. The first side of the triangle that forms passenger side panel 130 forms a base that, when installed on a pickup truck, contacts and sits upon the bed 10 of the pickup truck on the passenger side at the front of the bed 10 just behind the cab 20. The length of the second side of the triangle that forms passenger side panel 130 is generally equivalent to the distance between the top surface of the bed 10 and the height of the rearmost point of the cab 20. The first and second sides of the passenger side panel 130 may meet at an approximately ninety degree angle. The second side of the passenger side panel 130 connects to and shares a side with front panel 110 on the passenger side of the pickup truck, and passenger side panel 130 and front panel 110 are generally perpendicular to each other. The third side of the triangle that forms passenger side panel 130 contacts movable section 200 when movable 200 is in its lowered position. To provide stability to passenger side panel 130 and to assist with diverting water from hinged cover 1, the third side of the passenger side panel 130 may fold inwardly at an approximately ninety degree angle. The outermost edge of the folded portion of passenger side 130 may be folded again upwardly, thus forming a passenger side flange 147 that diverts water from the upper flange 145 downward and away from pickup bed 10. Passenger side flange 147 has sufficient height that water does not flow over the top of the passenger side flange 147, but instead flows down and away from hinged cover 1 and truck bed 10. When closed, movable section 200 engages and rests upon the driver side flange 146 and the passenger side flange 147. For additional stability and to provide a surface for clamping the front mount assembly 100 to the pickup bed 10, the first side of passenger side panel 130 may also be folded inwardly at an approximately ninety degree angle relative to the planar surface of passenger side panel 130. Passenger side panel 130 may feature holes 121 near the top corner between the first and second sides of the triangle of passenger side panel 130. The holes 121 allow for additional components of hinged cover 1 to be attached to passenger side panel 130.

The front panel 110, driver side panel 120, and passenger side panel 130 of the front mount assembly 100 may be formed from a single piece of material folded to form these sections as previously described. Front panel 110, driver side panel 120, and passenger side panel 130 may be formed from stainless steel, aluminum, or any other suitable material.

Figure 26:
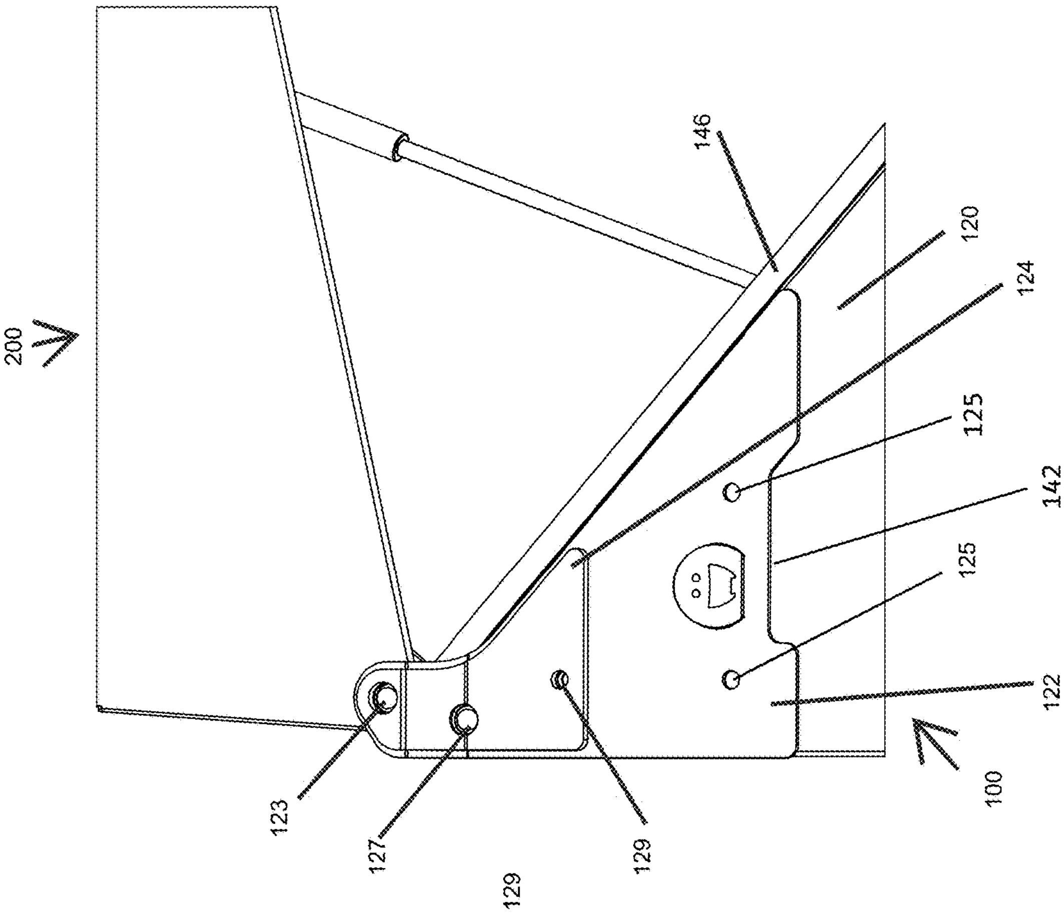
FIG. 26 illustrates a front mount assembly of a hinged cover for a pickup truck bed in accordance with one embodiment of the invention.
Figure 25:
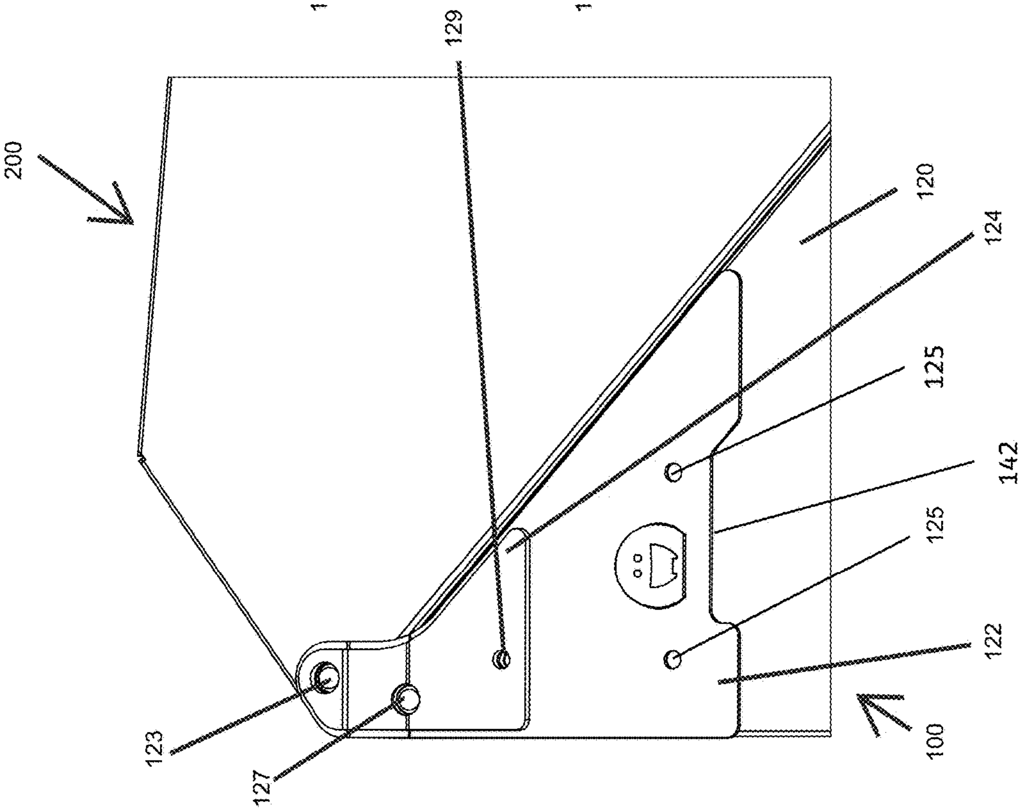
FIG. 25 illustrates a front mount assembly of a hinged cover for a pickup truck bed in accordance with one embodiment of the invention.
Figure 28:
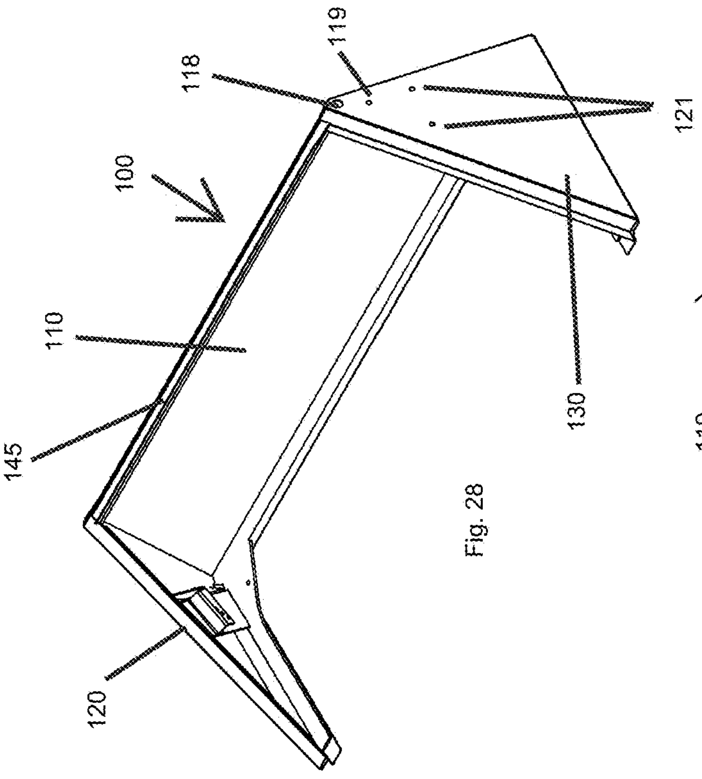
FIG. 28 illustrates a front mount assembly of a hinged cover for a pickup truck bed in accordance with one embodiment of the invention.
Figure 30:
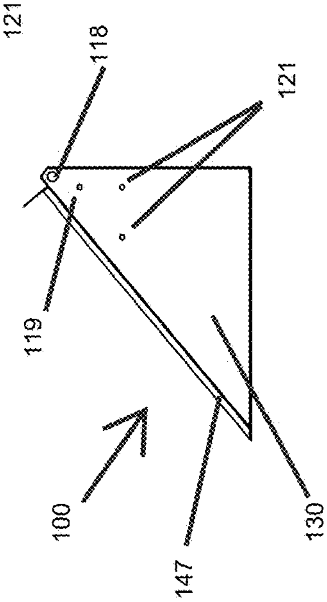
FIG. 30 illustrates a front mount assembly of a hinged cover for a pickup truck bed in accordance with one embodiment of the invention.
Figure 27:
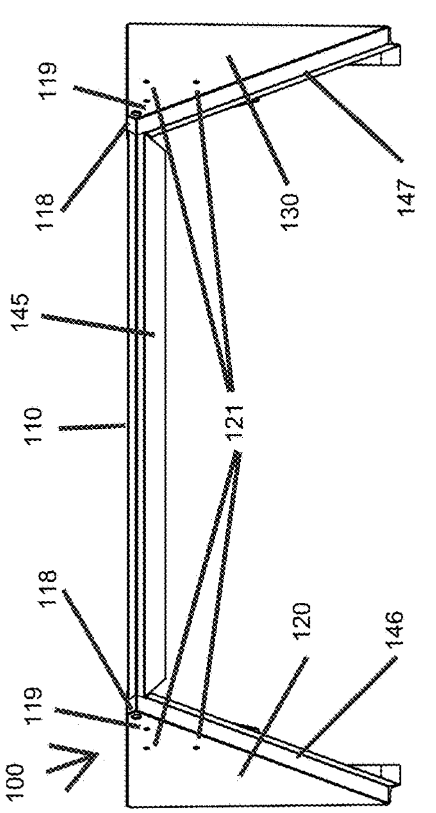
FIG. 27 illustrates a front mount assembly of a hinged cover for a pickup truck bed in accordance with one embodiment of the invention.
Figure 29:
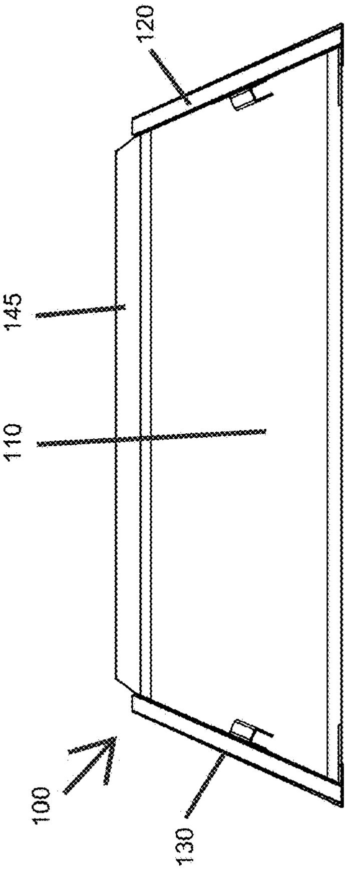
FIG. 29 illustrates a front mount assembly of a hinged cover for a pickup truck bed in accordance with one embodiment of the invention.

Mounted to driver side panel 120 is an inner hinge plate 122. Inner hinge plate 122 may comprise a generally triangular planar surface with an inner flat side that contacts and covers the upper corner of the driver side panel 120. The first side of the triangle that forms the inner hinge plate 122 is generally parallel to the first side of the triangle that forms driver side panel 120, and the length of the first side of the triangle that forms the inner hinge plate 122 runs from a point at the approximate center of the second side of the driver side panel 120 to a point at the approximate center of the third side of the driver side panel 120 such that the second and third sides of driver side panel 120 and inner hinge plate 122 are generally aligned with each other. The first side of the triangle that forms the inner hinge plate 122 may feature a notch 142. Notch 142 assists in uniformly distributing the load from the hinge pivot area to the rest of the driver side panel 120, reduces the weight of the inner hinge plate 122, and improves aesthetics of the hinged cover 1. The second side of the triangle that forms the inner hinge plate 122 is generally parallel to and aligned with the second side of the driver side panel 120. The third side of the triangle that forms the inner hinge plate 122 is generally parallel to and aligned with the third side of the driver side panel 120. Inner hinge plate 122 may feature holes 125 into which fasteners may be inserted. The fasteners pass through the holes 125 in inner hinge plate 122 and through corresponding holes 121 in the driver side panel 120, and the fasteners serve to hold inner hinge plate 122 and driver side panel 120 securely together. In one embodiment, two holes 125 are formed in inner hinge plate 122; however, any other number of holes 125 may be used without departing from the scope of the disclosure. In one embodiment, fasteners may be one or more bolts that are inserted into holes 125 to hold inner hinge plate 122 to driver side panel 120; however, another type of fastener or means of attachment may be used without departing from the scope of the disclosure. Preferably, a fastener that can easily be removed and reinserted is used such that the movable section 200 can be easily removed and reinstalled as needed. Optionally, as shown in FIGS. 25 and 26, a bottle opener may be formed in the outer flat side of inner hinge plate 122 because life is better with a bottle opener.

In one embodiment, mounted to the inner hinge plate 122 is an outer hinge plate 124. Outer hinge plate 124 may comprise a generally triangular planar surface with an inner flat side that contacts and covers the upper corner of the inner hinge plate 122. The first side of the triangle that forms the outer hinge plate 124 is generally parallel to the first side of the triangle that forms the inner hinge plate 122 and also to the first side of the triangle that forms driver side panel 120. The length of the first side of the triangle that forms the outer hinge plate 124 runs from a point at the approximate center of the second side of the inner hinge plate 122 to a point at the approximate center of the third side of the inner hinge plate 122 such that the second and third sides of driver side panel 120, inner hinge plate 122, and outer hinge plate 124 are generally aligned with each other. The upper point of the triangle formed by the second and third sides of the outer hinge plate 124 may feature an elongation that extends upward. The elongation in outer hinge plate 124 may feature holes 123 and 127 disposed within the elongation. Hole 123 serves as a primary pivot point as a rod or bolt can be inserted through hole 123, welded to the outer hinge plate 124, and movable section 200 rotates about the rod. The rod extends from the outer hinge plate 124, passing through hole 123 in the outer hinge plate 124. Hole 127 serves as secondary pivot point or locating point as a short rod, pin, or similar part can be welded into the hole 127, and when assembled the rod or pin inserts into a corresponding hole in inner hinge plate 122 and a corresponding hole 118 in the driver side panel 120 to assist with reassembly and reassembly of hinged cover 1. Placement of a rod or pin through hole 127 and the corresponding hole in inner hinge plate 122 and corresponding hole 118 in the driver side panel 120 also helps to distribute the load created by the movement of movable section 200 into the driver side panel 120. The second side of the triangle that forms the outer hinge plate 124 is generally parallel to and aligned with the second side of the inner hinge plate 122. The third side of the triangle that forms the outer hinge plate 124 is generally parallel to and aligned with the third side of the inner hinge plate 122. In one embodiment, outer hinge plate 124 and inner hinge plate 122 are welded together. Alternatively, outer hinge plate 124 may feature a hole 129 into which a fastener may be inserted. The fastener passes through the hole 129 in the outer hinge plate 124, through a corresponding hole in the inner hinge plate 122, and through a corresponding hole 119 in the driver side panel 120, and the fasteners serve to hold the outer hinge plate 124, inner hinge plate 122, and driver side panel 120 securely together. In one embodiment, one hole 129 is formed in outer hinge plate 124; however, any other number of holes 129 may be used without departing from the scope of the disclosure. In one embodiment, the fastener may be one or more bolts that are inserted into hole 129 to hold outer hinge plate 124, inner hinge plate 122, and driver side panel 120 securely together; however, another type of fastener or means of attachment may be used without departing from the scope of the disclosure. Preferably, a fastener that can easily be removed and reinserted is used such that the movable section 200 can be easily removed and reinstalled as needed. In yet another embodiment, the outer hinge plate 124 may be eliminated, in which case the rod or pin inserts through hole 127 in the inner hinge plate 122, and the rod is welded to the inner hinge plate 122, and the strength of the inner hinge plate 122 is replied upon to support the weight of the movable section 200 on the driver side.

Similar to the driver side inner hinge plate 122, mounted to passenger side panel 130 is an inner hinge plate 126. Inner hinge plate 126 may comprise a generally triangular planar surface with a first flat side that contacts and covers the upper corner of the passenger side panel 130. The first side of the triangle that forms the inner hinge plate 126 is generally parallel to the first side of the triangle that forms passenger side panel 130, and the length of the first side of the triangle that forms the inner hinge plate 126 runs from a point at the approximate center of the second side of the passenger side panel 130 to a point at the approximate center of the third side of the passenger side panel 130 such that the second and third sides of passenger side panel 130 and inner hinge plate 126 are generally aligned with each other. The first side of the triangle that forms the inner hinge plate 126 may feature a notch 142. Notch 142 assists in uniformly distributing the load from the hinge pivot area to the rest of the passenger side panel 130, reduces the weight of the inner hinge plate 126, and improves aesthetics of the hinged cover 1. The second side of the triangle that forms the inner hinge plate 126 is generally parallel to and aligned with the second side of the passenger side panel 130. The third side of the triangle that forms the inner hinge plate 126 is generally parallel to and aligned with the third side of the passenger side panel 130. Inner hinge plate 126 may feature holes 125 into which fasteners may be inserted. The fasteners pass through the holes 125 in inner hinge plate 126 and through corresponding holes 121 in the passenger side panel 130, and the fasteners serve to hold inner hinge plate 126 and passenger side panel 130 securely together. In one embodiment, two holes 125 are formed in inner hinge plate 126; however, any other number of holes 125 may be used without departing from the scope of the disclosure. In one embodiment, fasteners may be one or more bolts that are inserted into holes 125 to hold inner hinge plate 126 to passenger side panel 130; however, another type of fastener or means of attachment may be used without departing from the scope of the disclosure. Preferably, a fastener that can easily be removed and reinserted is used such that the movable section 200 can be easily removed and reinstalled as needed. Optionally, as shown in FIGS. 25 and 26, a bottle opener may be formed in the outer flat side of inner hinge plate 126.

Similar to the driver side outer hinge plate 124, in one embodiment, mounted to the inner hinge plate 126 is an outer hinge plate 128. Outer hinge plate 128 may comprise a generally triangular planar surface with an inner flat side that contacts and covers the upper corner of the inner hinge plate 126. The first side of the triangle that forms the outer hinge plate 128 is generally parallel to the first side of the triangle that forms the inner hinge plate 126 and also to the first side of the triangle that forms passenger side panel 130. The length of the first side of the triangle that forms the outer hinge plate 128 runs from a point at the approximate center of the second side of the inner hinge plate 126 to a point at the approximate center of the third side of the inner hinge plate 126 such that the second and third sides of passenger side panel 130, inner hinge plate 126, and outer hinge plate 128 are generally aligned with each other. The upper point of the triangle formed by the second and third sides of the outer hinge plate 128 may feature an elongation that extends upward. The elongation in outer hinge plate 128 may feature holes 123 and 127 disposed within the elongation. Hole 123 serves as a primary pivot point as a rod can be inserted through hole 123, welded to the outer hinge plate 128, and movable section 200 rotates about the rod. The rod extends from the outer hinge plate 128, passing through hole 123 in the outer hinge plate 128. Hole 127 serves as secondary pivot point or locating point as a short rod, pin, or similar part can be welded into 127, and when assembled the rod or pin inserts into a corresponding hole in inner hinge plate 126 and a corresponding hole 118 in the passenger side panel 130 to assist with reassembly and reassembly of hinged cover 1. Placement of a rod or pin through hole 127 and the corresponding hole in inner hinge plate 126 and the corresponding hole 118 in the passenger side panel 130 also helps to distribute the load created by the movement of movable section 200 into the passenger side panel 130. The second side of the triangle that forms the outer hinge plate 128 is generally parallel to and aligned with the second side of the inner hinge plate 126. The third side of the triangle that forms the outer hinge plate 128 is generally parallel to and aligned with the third side of the inner hinge plate 126. In one embodiment, outer hinge plate 128 and inner hinge plate 126 are welded together. Alternatively, outer hinge plate 128 may feature a hole 129 into which a fastener may be inserted. The fastener passes through the hole 129 in the outer hinge plate 128, through a corresponding hole in the inner hinge plate 126, and through a corresponding hole 119 in the passenger side panel 130, and the fasteners serve to hold the outer hinge plate 128, inner hinge plate 126, and passenger side panel 130 securely together. In one embodiment, one hole 129 is formed for this purpose in outer hinge plate 128; however, any other number of holes 129 may be used without departing from the scope of the disclosure. In one embodiment, the fastener may be one or more bolts that are inserted into hole 129 to hold outer hinge plate 128, inner hinge plate 126, and passenger side panel 130 securely together; however, another type of fastener or means of attachment may be used without departing from the scope of the disclosure. Preferably, a fastener that can easily be removed and reinserted is used such that the movable section 200 can be easily removed and reinstalled as needed. In yet another embodiment, the outer hinge plate 128 may be eliminated, in which case the rod or pin inserts through hole 127 in the inner hinge plate 126, and the rod is welded to the inner hinge plate 126, and the strength of the inner hinge plate 126 is replied upon to support the weight of the movable section 200 on the passenger side.

When the movable section 200 is raised or lowered, a lot of force is exerted on the bed 10. The triangular shapes of the driver side panel 120 and the passenger side panel 130 help to distribute the force evenly across the bed 10 to avoid damage to the bed 10. In addition, the length of the first side or base of the driver side panel 120 and the passenger side panel 130 is chosen to counter the force experienced by the movement of the movable section 200. The reactionary torque (force x distance) into the body of the truck bed 10 is reduced by a longer base. In one embodiment, the length of the first side or base of the driver side panel 120 and passenger side panel 130 is approximately 24 inches; however other lengths may be used for driver side panel 120 and passenger side panel 130 without departing from the scope of the disclosure.

Figure 31:
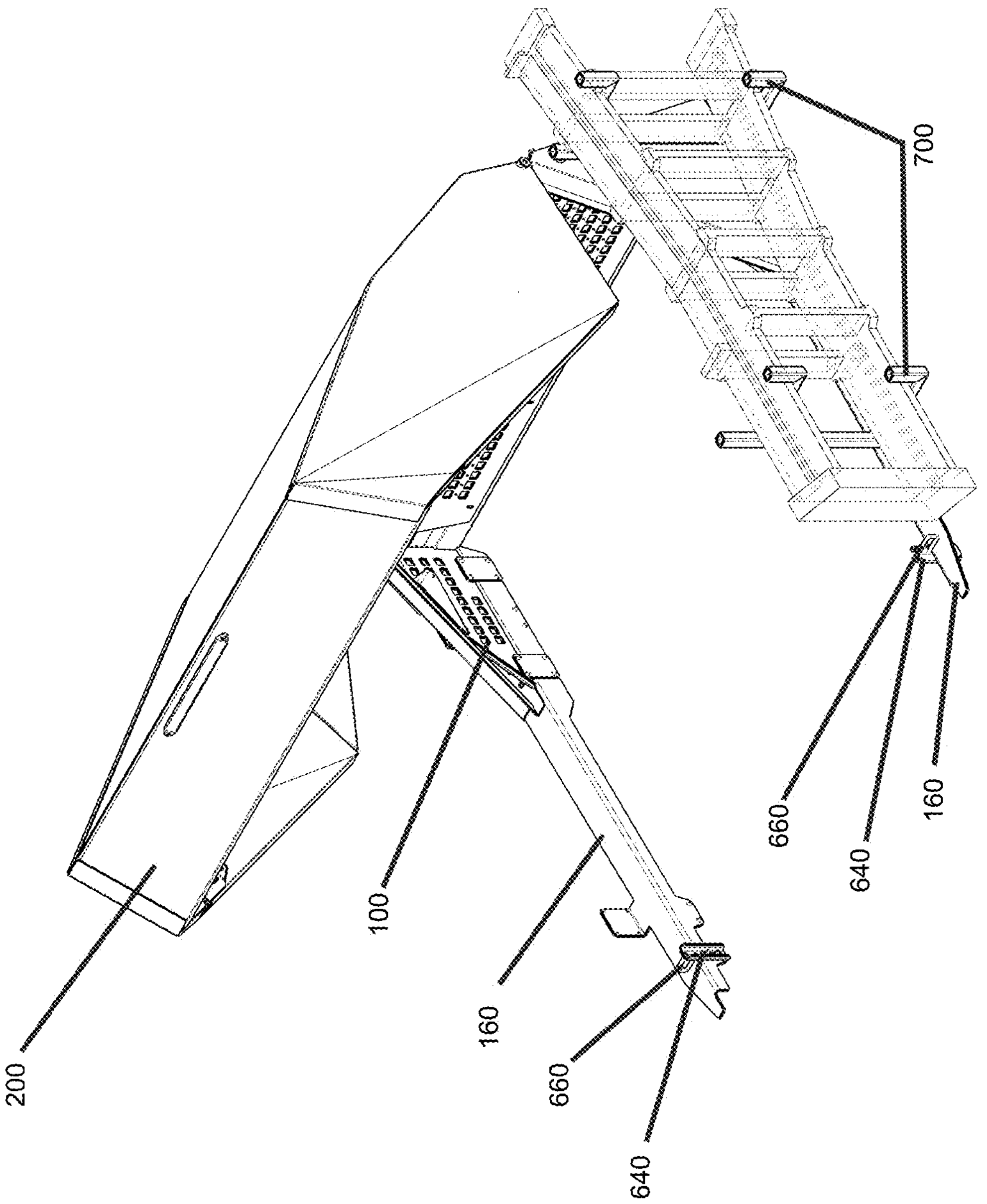
FIG. 31 illustrates a hinged cover for a pickup truck bed with a ladder mounting accessory in accordance with one embodiment of the invention.
Figure 32:
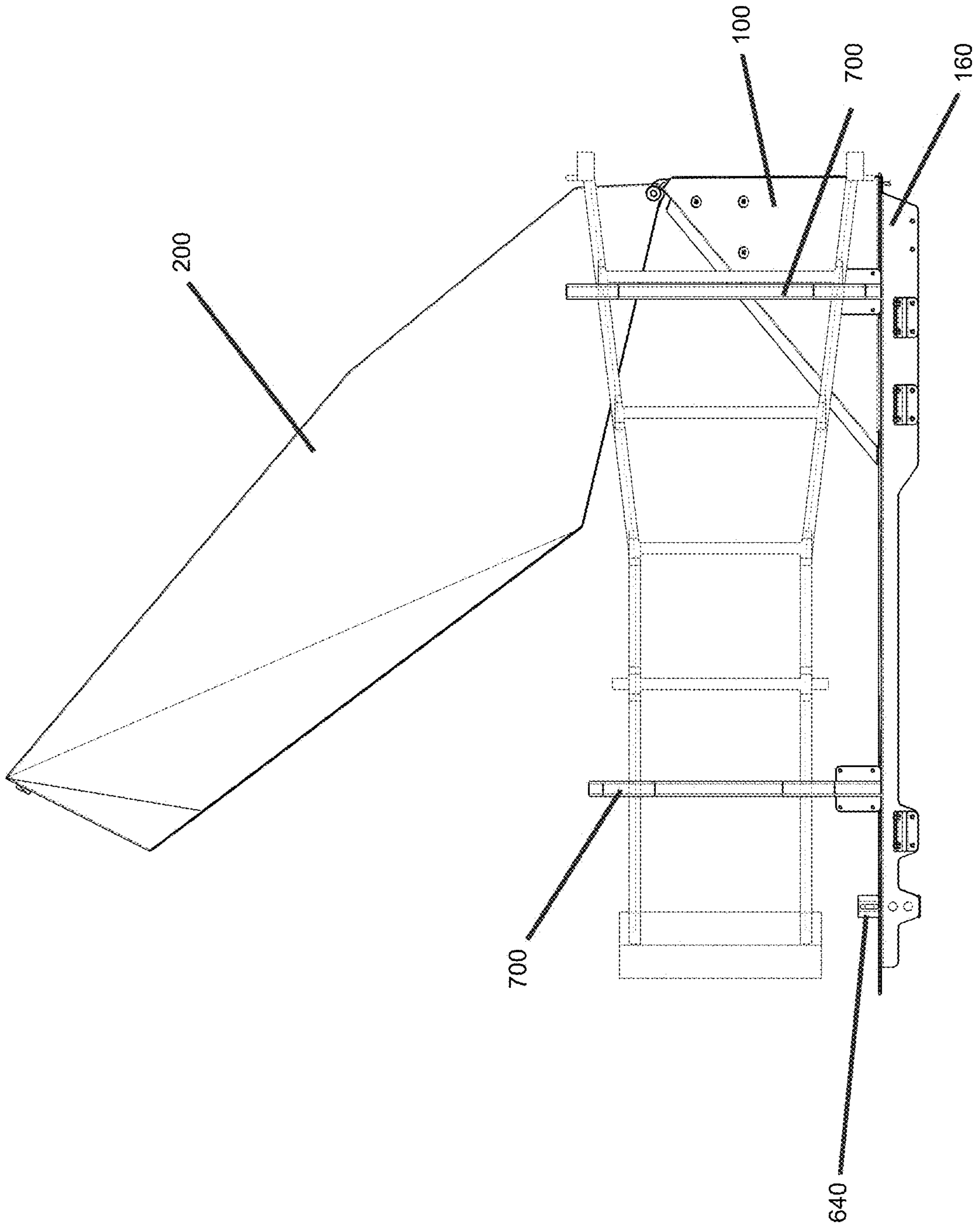
FIG. 32 illustrates a hinged cover for a pickup truck bed with a ladder mounting accessory in accordance with one embodiment of the invention.
Figure 33:
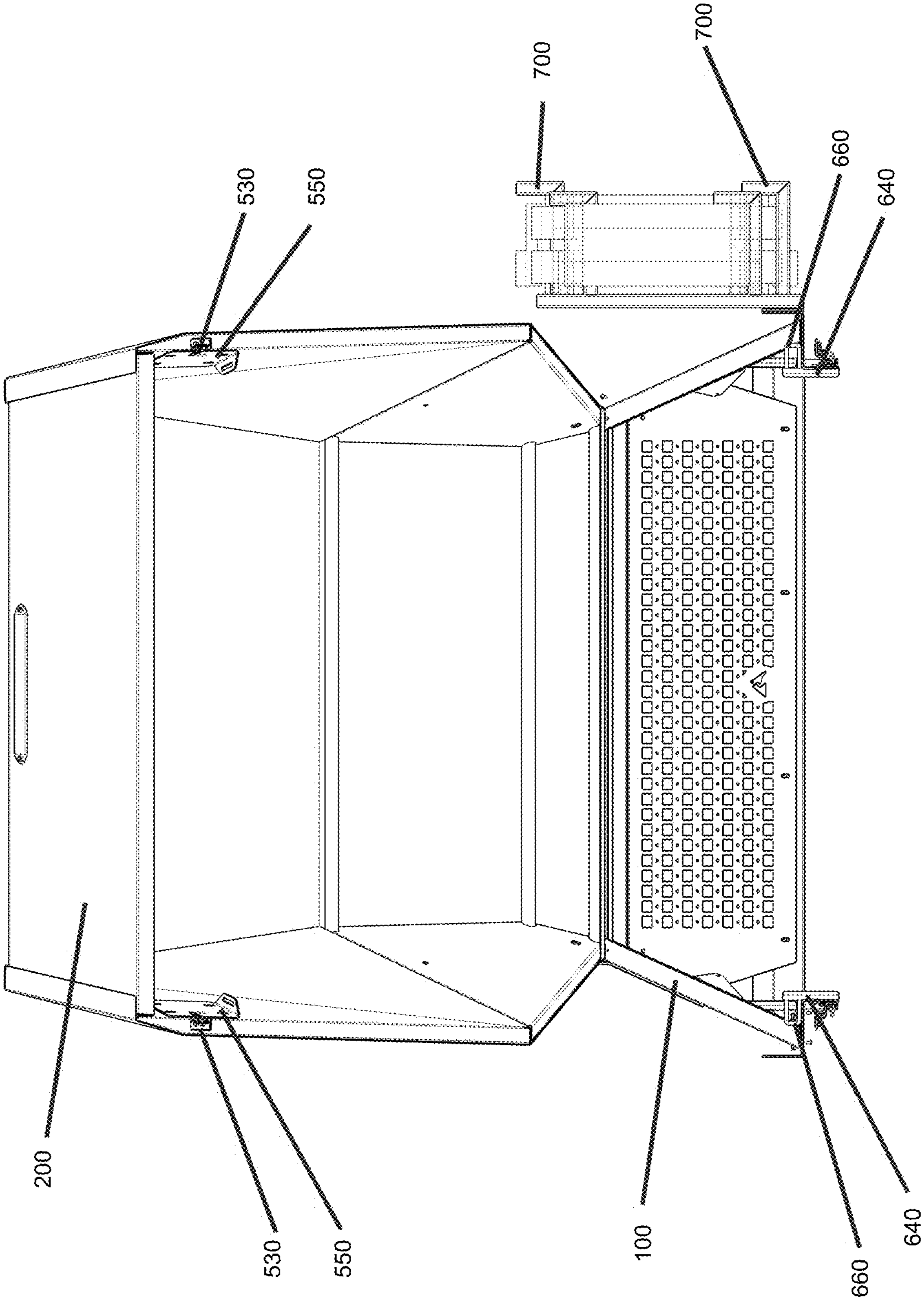
FIG. 33 illustrates a hinged cover for a pickup truck bed with a ladder mounting accessory in accordance with one embodiment of the invention.
Figure 35:
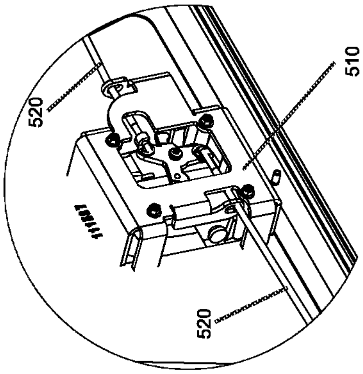
FIG. 35 illustrates a detail view of a rear latch actuator in accordance with one embodiment of the invention.
Figure 36:
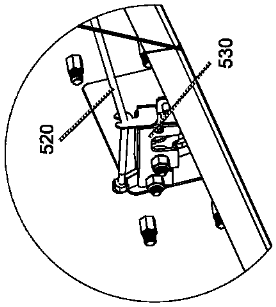
FIG. 36 illustrates a detail view of a side latch in accordance with one embodiment of the invention.
Figure 34:
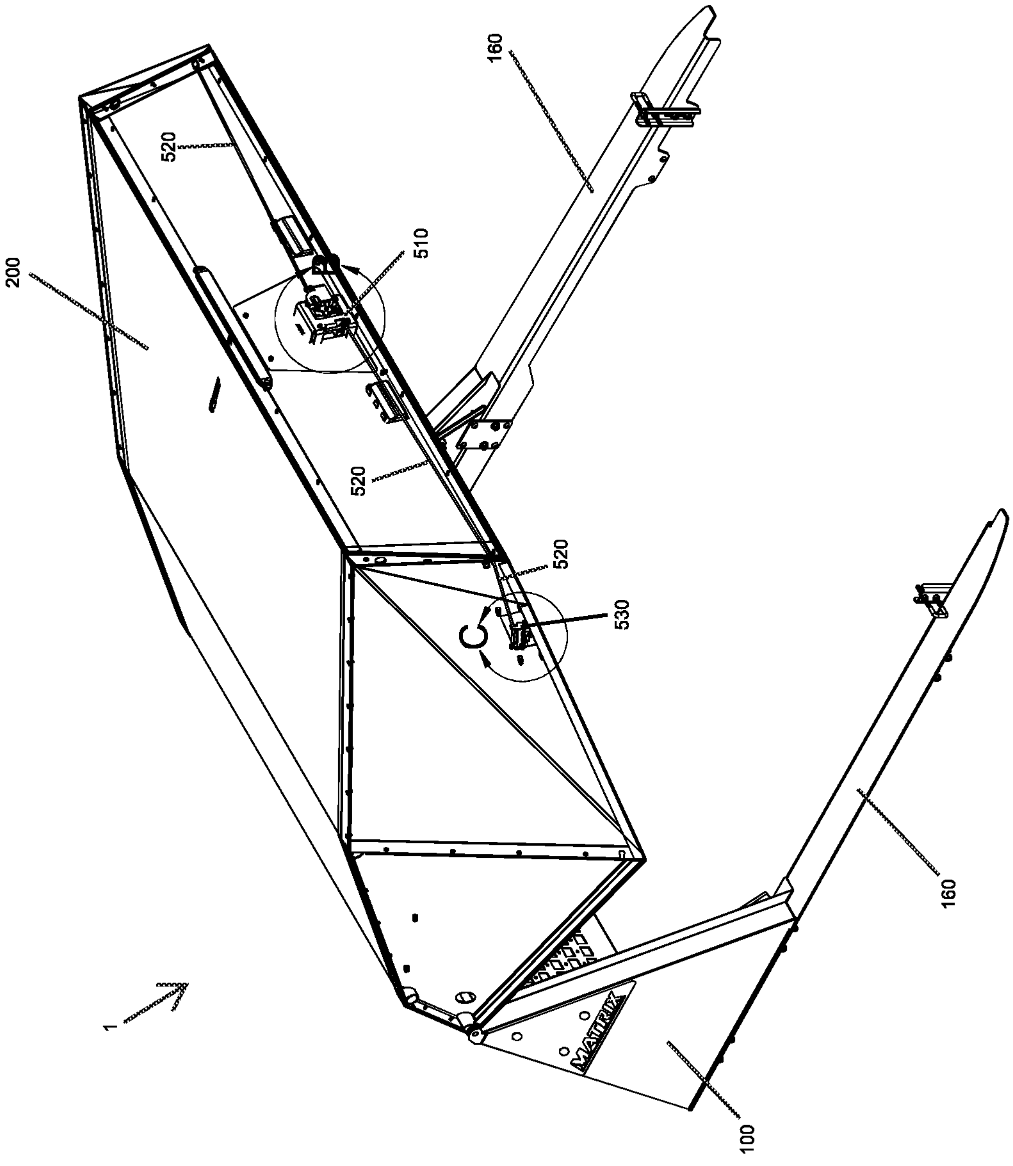
FIG. 34 illustrates a rear latch actuator assembly in accordance with one embodiment of the invention.

Additional load distribution may be achieved with the use of a "kick stand" comprising a plate placed beneath the front mount assembly and extending vertically between the front mount assembly and the bed 10 surface or another rigid structure associated with the truck bed 10. In one embodiment, the components of the front mount assembly 100 can be mounted directly to the pickup truck bed 10. Alternatively, as shown in FIGS. 31-33, the load can be further distributed by adding rails 160 to the base unit between the front mount assembly 100 and the pickup truck bed 10. A first rail 160 may be mounted to the top of the pickup bed 10 on the driver side and a second rail 160 may be mounted to the top of the pickup bed 10 on the passenger side. Each rail 160 comprises an elongated piece of sheet metal, angle iron, or other suitable material. Each rail 160 may be folded or otherwise shaped into an approximately 90 degree angle to form a generally horizontal top surface that rests upon the top of the pickup bed 10 and a generally vertical surface that engages the inner side edge of the pickup bed 10 near the top of the pickup bed 10. A D-ring attachment plate 640 may be bolted or otherwise attached to the inner side edge of each rail 160. D-ring attachment plate 640 may comprise an elongated metal strip with a slot and two holes disposed in the metal strip. A D-ring 660 configured to engage one or the side latches 530 is inserted into the holes disposed in the D-ring attachment plate 640, allowing the hinged cover 1 to be held in in a closed position. By inserting a bolt through the slot and a corresponding hole in the rail 160, the D-ring attachment plate 640 is securely attached to the rail 160. The D-ring attachment plate 640 can be adjusted by loosening the bolt or other fastener securing the D-ring attachment plate 640 to the rail 160 and moving the D-ring attachment plate 640 along the slot. Such adjustment allows the D-ring attachment plate 640 to be moved into alignment with side latches 530. Each rail 160 is approximately equal in length to the total length of the hinged cover 1 measured from the forwardmost point of the front mount assembly 100 to the rearwardmost point of the movable section 200. A lip, flange, or seal may run along the length of rails 160 to help with water deflection and keeping dust out. The front mount assembly 100 mounts to rails 160 using bolts, clamps, or any other suitable fastener. Use of rails 160 has the advantage of providing better alignment of the components of hinged cover 1 as components. Use of rails 160 rather than mounting the front mount assembly 100 directly to the bed 10 of the truck also has the advantages of easier mounting by an end user, simpler mounting of latch mechanisms, load distribution along the length of the rails 160, and the potential for mounting other items, for example a ladder, via one or more brackets attached to one or both rails 160 while still being able to raise the movable section 200. For example, as shown in FIGS. 31-33, one or more accessory mounting brackets 100 may be mounted to a rail 160, allowing a ladder or other accessory to be carried on the side of the vehicle. When a ladder or other accessory is mounted using brackets 700, the movable section 200 may be raised or lowered without affecting the position of the objected mounted using the brackets 700.

The arrangement of components of the front mount assembly 100 has an advantage of providing great smoothness and rigidity to the operation of hinged cover 1. With the described structure, a person can pull down on either the driver side panel 220 or the passenger side panel 230 of the movable section 200 alone and close movable section 200 smoothly without twisting or racking. The described hinge assembly used for the front mount assembly 100 also has an advantage of avoiding metal on metal contact during rotation of the movable section 200, thus preventing component wear.

Lower Subframe Section 300

As shown in FIGS. 21-24, a lower subframe section 300 is disposed within the front mount assembly 100. The lower subframe section 300 provides support for the front mount assembly 100 and for other components of the hinged cover 1. In one embodiment, lower subframe section 300 is formed from metal tubes or pipes; however, other materials such as sheet metal or fiberglass may be used for lower subframe section 300 without departing from the scope of the disclosure. Lower subframe section 300 may comprise a triangular subframe section 310 disposed inside each of the driver side panel 120 and the passenger side panel 130.

On the driver side, the triangular subframe section 310 comprises a first side seated within the folded portion of the first side of driver side panel 120, contacting the inner surface of driver side panel 120. The first side of the triangular subframe section 310 is generally aligned with and parallel to the first side of the driver side panel 120. The second side of the triangular subframe section 310 is seated within and contacts the inner surface of the driver side panel 120 along the line at which the driver side panel 120 meets the front panel 110. The second side of the triangular subframe section 310 is generally aligned with and parallel to the second side of the driver side panel 120. The third side of the triangular subframe section 310 contacts the inner surface of the driver side panel 120, and is generally aligned with and parallel to the third side of the driver side panel 120. The third side of the triangular subframe section 310 is disposed on the inward facing side of hinged cover 1, as opposed to the outward facing side that is driver side flange 146.

Similarly, on the passenger side, the triangular subframe section 310 comprises a first side that is seated within the folded portion of the first side of passenger side panel 130, contacting the inner surface of passenger side panel 130. The first side of the triangular subframe section 310 is generally aligned with and parallel to the first side of the passenger side panel 130. The second side of the triangular subframe section 310 is seated within and contacts the inner surface of the passenger side panel 130 along the line at which the passenger side panel 130 meets the front panel 110. The second side of the triangular subframe section 310 is generally aligned with and parallel to the second side of the passenger side panel 130. The third side of the triangular subframe section 310 contacts the inner surface of the passenger side panel 130, and is generally aligned with and parallel to the third side of the passenger side panel 130. The third side of the triangular subframe section 310 is disposed on the inward facing side of hinged cover 1, as opposed to the outward facing side that is passenger side flange 147.

Connecting the driver side and passenger side triangular subframe sections 310 is a lower subframe front 320. Lower subframe front 320 is a generally straight length of tubing or pipe that connects the intersection of the first and second sides of the driver side triangular subframe section 310 to the intersection of the first and second sides of passenger side triangular subframe section 310. Lower subframe front 320 is seated on the inside corner of the fold formed on the lower edge of the front panel 110.

In one embodiment, the lower subframe section 300 is glued to the front mount assembly 100; however, the lower subframe section 300 may be attached by other means without departing from the scope of the disclosure.

Movable Section 200

Movable section 200 comprises one or more roof panels 210, a driver side panel 220, and a passenger side panel 230. Movable section 200 is hingedly attached to front mount assembly 100, and movable section rotates about rod between open and closed positions. Hydraulic arms, linear actuators, or other suitable devices may assist with lifting movable section 200 and holding movable section 200 in its open position. The driver side panel 220 of the movable section 200 has a forward-most edge that engages driver side flange 146 when movable section 200 is in its closed position. Similarly, the passenger side panel 230 of the movable section 200 has a forward-most edge that engages passenger side flange 147 when movable section 200 is in its closed position.

Movable section 200 further comprises a front panel 240. The front panel 240 of the movable section 200 comprises a generally rectangular planar surface of the movable section 200. Front panel 240 of the movable section 200 is disposed at the forward-most point of the movable section 200, and has a length that extends generally from the driver side panel 120 of the front mount assembly 100 to the passenger side panel 130 of the front mount assembly 100. Front panel 240 of movable section 200 angles rearwardly away from the cab 20 such that front panel 240 and movable section 200 do not strike or otherwise interfere with the cab 20 when movable section 200 at any point along the travel path of movable section 200. The top edge of front panel 240 engages the forward-most edge of the forward-most roof panel 210. As shown, movable section 200 has two adjacent roof panels 210; however, other numbers of roof panels 210 may be included in movable section 200 without departing from the scope of the disclosure.

At the rear of movable section 200 is a back panel 250. The rear panel 250 of movable section 200 comprises a generally rectangular planar surface at the rear of movable section 200. Rear panel 250 of the movable section 200 is disposed at the rearward-most point of the movable section 200, and has a length that extends generally from the driver side panel 220 of the movable section 200 to the passenger side panel 230 of the movable section 200. The top edge of rear panel 250 engages the rearward-most edge of the rearward-most roof panel 210, and the bottom edge of rear panel 250 contacts and rests upon the top edge of the tailgate of pickup truck bed 10 when movable section 200 is in its closed position. For additional stability, the bottom edge of the rear panel 250 may be folded inwardly such that the generally planar surface of the rear panel 250 and the folded edge of rear panel 250 are generally perpendicular to each other, and the folded edge of rear panel 250 rests upon the tailgate.

Roof panels 210, driver side panel 220, passenger side panel 230, front panel 240, and rear panel 250 of movable section 200 may be formed from a single sheet of material that is folded to form the various panel sections of movable section 200 in order to form a shell. The use of a single sheet of material for forming the shell of movable section 200 prevents water from penetrating the bed 10, and also adds to the aesthetic appearance of hinged cover 1. In one embodiment, the shell of movable section 200 is formed from stainless steel or aluminum; however, any other suitable material may be used without departing from the scope of the disclosure. Driver side panel 220 and passenger side panel 230 of the movable section 200 may each feature a slight bend that prevents "oil-canning" or deflection. Similar folds may be placed in one or more roof panels 210, front panel 240, or rear panel 250 to further address such deflection.

The roof panels 210, driver side panel 220, passenger side panel 230, front panel 240, and rear panel 250 of the movable section 200 may have a hollow double wall to provide better insulation and increased rigidity and stability. The more rigid the structure of the movable section 200, the easier it is to latch the hinged cover 1. Torsional rigidity is an important feature of the hinged cover 1. The rigidity of the front mount assembly 100 determines the position of the movable section 200 hinge location, and it also provides the user with a comfortable sense of strength. With a torisionally rigid front mount assembly 100 as a platform to mount the movable section 200, the movable section 200 must also be torsionally rigid. This not only feels good to the user, but it also determines the alignment of the rear latch 510 and D-ring 660. Hollow wall construction also has the advantage that all holes and attachment points are internal to the hinged cover 1, meaning that no holes or attachments are visible on the outside, leaving no infiltration points, no disassembly from the outside, and increased security.

The hollow wall sections of driver side panel 220, passenger side panel 230, and rear panel 250 of the movable section 200 provides strength to the structure of the movable section 200. The strength of the structure typically increases substantially, often by orders of magnitude, when the outer surfaces of the structure are moved further apart. For example, a 2 inch thick sheet of foam is eight times more rigid than a 1 inch thick sheet of foam. To achieve the desired rigidity for the hinged cover 1, the design incorporates hollow sections for driver side panel 220, passenger side panel 230, and rear panel 250 of the movable section 200 instead of solid panels. There are several methods to create hollow sections. The hinged cover 1 uses round and rectangular extrusions as well as joined sheet metal panels. Alternately, a "hollow section" can be made by separating two sheets of material with a foam core. Technically, the foam fills the void between the two sheets, but this technique is considered a "hollow core" or "hollow section" in the industry.

The panels of the upper subframe section 400 may taper downwardly toward the back of the truck bed 10 to increase the aerodynamic performance of the hinged cover 1.

Upper Subframe Section 400

As shown in FIGS. 21-24, an upper subframe section 400 is disposed within the shell of movable section 200. The upper subframe section 400 provides support for the movable section 200. In one embodiment, upper subframe section 400 is formed from metal tubes or pipes; however, any other suitable material such as sheet metal or fiberglass may be used for constructing upper subframe section 400 without departing from the scope of the disclosure. Upper subframe section 400 may comprise a plurality of generally parallel lengths of frame material disposed in the fold that separates each pair of adjacent panel sections and extend from the driver side panel 220 of movable section 200 to the passenger side panel 230 of the movable section 200. Additional lengths of frame material are disposed along the edges of the driver side panel 220 of the movable section 200 and the passenger side panel 230 of the movable section 200.

As the movable section 200 is raised and lowered, a twisting effect or moment is experienced. The triangular shape of the driver side panel 120 of the front mount assembly 100 and the passenger side panel 130 of the front mount assembly 100 help to counter the moment. Another key feature that contributes to the torsional rigidity of the hinged cover 1 is the generally rectangular front frame section 410 seated within the movable section 200 adjacent to the front panel 240 of the movable section 200. The front frame section 410 comprises a top frame segment 420 and a bottom frame segment 430. The top frame segment 420 and the bottom frame segment are generally parallel to each other, and each of the top frame segment 420 and the bottom frame segment extend generally from the driver side panel 120 to the passenger side panel 130. A driver side frame segment 440 connects the ends of the top frame segment 420 and the bottom frame segment 430 that are disposed on the driver side of the front frame section 410. Likewise, a passenger side frame segment 440 connects the ends of the top frame segment 420 and the bottom frame segment 430 that are disposed on the passenger side of the front frame section 410. The driver side frame segment 440 and the passenger side frame segment 450 are generally parallel to each other, and are generally perpendicular to the top frame segment 420 and the bottom frame segment 430. The bottom frame segment 430 is the part of the movable section 200 that the rod passes through, allowing the movable section 200 to be raised and lowered as it rotates about rod. The structure of the generally rectangular front frame section 410 helps to counter the moment experienced by the hinged cover 1 as the movable section 200 is rotated between open and closed positions. The front frame section 410 may be installed at an angle to prevent interfering with the vehicle cab 20 when the movable section 200 is raised. The contiguous perimeter of section 250 substantially adds to the torsional rigidity of section 200 when combined with the adjoining sections 220, 230, 210, and 240.

In one embodiment, the upper subframe section 400 is glued to the shell of the movable section 200; however, the upper subframe section 400 may be attached by other means without departing from the scope of the disclosure.

Rear Latch Assembly

In such an embodiment, the rear latch actuator assembly and rear latch actuator 510 of hinged cover 1 are disposed on the interior of the hinged cover 1; therefore the rear latch actuator assembly and rear latch actuator 510 are concealed and inaccessible from the outside of the hinged cover 1, and the rear latch actuator 510 can only be seen or accessed by first opening the pickup's tailgate. The rear latch actuator assembly allows the movable section 200 to be held securely in a closed position or raised when the rear latch actuator 510 is actuated. The rear latch actuator 510 is disposed on an interior surface of the rear panel 250 of the movable section 200. The rear latch actuator 510 may be disposed near the lower edge of the rear panel 250 at or near the center of the lower edge of the rear panel 250 where rear latch actuator 510 can be easily accessed by a person's hand. The rear latch actuator 510 may be disposed within a recess in the rear panel 250 to avoid protrusion of rear latch actuator assembly components into the cargo compartment of pickup bed 10 or the interior cavity formed by the hinged cover 1. The recess also aids in locating the rear latch actuator 510 when the person actuating the rear latch actuator 510 cannot see the rear latch actuator 510. The rear latch actuator 510 may be any commercially available latch actuator.

Connected to the rear latch actuator 510 are one or more cables 520. The one or more cables 520 transfer motion of the rear latch actuator 510 to one or more side latches 530, allowing actuation of rear latch actuator 510 to also actuate the side latches 530. The first end of each cable 520 connects to the rear latch actuator 510, and the second end of each cable 520 connects to a side latch 530. The cables 520 may comprise a cable, chain, cord, or similar device capable of transferring the motion of rear latch to side latches 530.

In one embodiment, a first side latch 530 attaches to the interior of driver side panel 220 at or near the rear and at or near the lower edge of the driver side panel 220. A second side latch 530 attaches to the interior of passenger side panel 230 at or near the rear and at or near the lower edge of the passenger side panel 230. The first and second side latches 530 may each be installed on a removable side latch plate 550 that is then attached to driver side panel 220 or passenger side panel 230 such that the side latch 530 is disposed within a recess in the driver side panel 220 or passenger side panel 230. Installation of the side latches 530 using side latch plates 550 allows the side latch 530 to be accessed if adjustment, repair, or replacement is needed. Each side latch 530 engages a D-ring 660 or similar structure attached directly or indirectly to the pickup bed 10, holding the movable section 200 in a closed position via a keeper. The keeper remains securely in place when the rear latch 510 has not been actuated and the movable section 200 is in a closed position. The placement of side latch plates 550 and side latches 530 can be adjusted such that the keepers are aligned with the D-ring 660 or similar structure, which is important because the position of D-ring 660 can vary between vehicles and precise alignment is needed to ensure that the hinged cover 1 can be secured in the closed position.

When the rear latch actuator 510 is actuated, one or more cables 520 attached to the rear latch actuator 510 are pulled, thus releasing the keeper of the one or more side latches 530 and allowing each side latch 530 to release its respective D-ring 660 and the movable section 200 can then be raised into its open position. Each side latch 530 may be a commercially available cam latch, slam latch, or any other commercially available latch.

By concealing the rear latch actuator assembly and rear latch actuator 510, security of items stored in the pickup bed 10 is improved. Concealing the rear latch actuator assembly and rear latch actuator 510 is also more convenient as only the keys or key fob for opening the tailgate of the pickup bed 10 is needed to open the hinged cover 1; the driver does not need to carry or care for extra keys. In addition, the mechanism for opening the hinged cover 1 is shielded from the elements, preventing ice cover or other conditions that could otherwise hinder the opening of the hinged cover 1.

Stake Pocket Insert and Adjustable D-Ring Assembly

In one embodiment, the hinged cover 1 is secured in the closed position by the engagement of the first side latch 530 with a first stake pocket insert and adjustable D-ring assembly and engagement of the second side latch 530 with a second stake pocket insert and adjustable D-ring assembly.

The stake pocket insert can be inserted into and retained by a stake pocket formed in a sidewall of a bed 10 of a pickup truck. Each stake pocket insert comprises a stake pocket insert body. The stake pocket insert body comprises a first stake pocket insert wall and a second stake pocket insert wall extending opposite to the first stake pocket insert wall. Both the first stake pocket insert wall and the second stake pocket insert wall comprise generally planar surfaces, and the plane formed by first stake pocket insert wall and the plane formed by the second stake pocket insert wall are generally parallel to each other. The stake pocket insert body further comprises a third stake pocket insert wall that connects an edge of the first stake pocket insert wall to the corresponding edge of the second stake pocket insert wall. The third stake pocket insert wall comprises a generally planar surface, and the plane formed by the third stake pocket insert wall is generally perpendicular to the planes formed by the first stake pocket insert wall and the second stake pocket insert wall. Together, the first stake pocket insert wall, second stake pocket insert wall, and third stake pocket insert wall form a generally box-shaped structure that can be inserted into a stake pocket that is formed in a sidewall of a pickup bed 10. A hole disposed in the third stake pocket insert wall aligns with a hole formed in the sidewall of the pickup bed 10. A nut is welded or otherwise attached to the third stake pocket insert wall such that the threaded hole of the nut aligns with the hole and the hole formed in the sidewall of the pickup bed 10. By securing a bolt or similar fastener through the hole formed in the sidewall of the pickup bed 10, the hole, and the nut, the stake pocket insert body is secured to the pickup bed 10. The generally box-shaped structure formed by the first stake pocket insert wall, second stake pocket insert wall, and third stake pocket insert wall may be formed from one piece of material; alternatively, three separate plates may be joined by welding, adhesive, or another suitable method for joining the material together.

Within the interior space formed by the first stake pocket insert wall, second stake pocket insert wall, and third stake pocket insert wall, a D-ring attachment plate connects the first stake pocket insert wall along a first edge of the D-ring attachment plate, second stake pocket insert wall along a second edge of the D-ring attachment plate, and third stake pocket insert wall along a third edge of the D-ring attachment plate. The first and second edges of the D-ring attachment plate are opposite and generally parallel to each other. The third edge of the D-ring attachment plate extends between and is generally perpendicular to the first and second edges of the D-ring attachment plate. The D-ring attachment plate comprises a generally planar surface, and the plane formed by the D-ring attachment plate is generally perpendicular to the planes formed by the first stake pocket insert wall, second stake pocket insert wall, and third stake pocket insert wall. In addition, when the stake pocket insert body is inserted into the stake pocket of the pickup bed 10, the first stake pocket insert wall, second stake pocket insert wall, and third stake pocket insert wall are each generally vertical, and the D-ring attachment plate is generally horizontal. A hole disposed in the D-ring attachment plate aligns with the threaded hole of a nut welded or otherwise adhered to the D-ring attachment plate. By securing the screw through the hole and nut, the D-ring assembly is secured to and retained by the stake pocket insert body.

The first stake pocket insert wall, second stake pocket insert wall, and third stake pocket insert wall may comprise generally rectangular plates or may feature holes or other cut-out portions. The stake pocket insert walls may be approximately the same height or different heights. For example, in one embodiment, the first stake pocket insert wall and second stake pocket insert wall are generally symmetric to each other and the third stake pocket insert wall is shorter than stake pocket insert walls and the D-ring attachment plate overlaps and rests upon the top edge of the third stake pocket wall where the D-ring attachment plate and third stake pocket wall meet and are attached to each other.

At or near the top edge of the generally box shaped structure formed by the first stake pocket insert wall, second stake pocket insert wall, and third stake pocket insert wall, a top plate connects at least the first stake pocket insert wall and the second stake pocket insert wall. The top plate comprises a generally planar surface adjacent to the D-ring attachment plate, and the plane formed by the top plate is generally perpendicular to the planes formed by the first stake pocket insert wall, second stake pocket insert wall, and third stake pocket insert wall. In addition, when the stake pocket insert body is inserted into the stake pocket of the pickup bed 10, the first stake pocket insert wall, second stake pocket insert wall, and third stake pocket insert wall are each generally vertical, and the top plate and D-ring attachment plate are generally parallel to each other and generally horizontal. Top plate may feature a hole, opening, or cutout portion in the area where D-ring assembly is inserted to accommodate placement and rotation of the D-ring assembly. The top plate covers the opening of the stake pocket formed in the side wall of the pickup bed 10, serving an aesthetic purpose and preventing objects from entering the stake pocket.

The D-ring assembly comprises a D-ring plate that comprises a generally rectangular and generally planar surface. The corners of the generally rectangular shape of D-ring plate may be rounded. The D-ring plate features a hole disposed in the approximate center of the generally rectangular shape of the D-ring plate. The D-ring plate provides support for the other components of the D-ring assembly.

A rod or screw is inserted through the hole in the D-ring plate from the top side of the D-ring plate, and the head of the screw is attached to the D-ring plate by welding or another suitable attachment method. By securing the screw through the hole and nut, the D-ring assembly is secured to and retained by the stake pocket insert body. When secured to a stake pocket insert body that has been installed in a stake pocket of a pickup bed 10, the plane defined by the D-ring plate is generally horizontal and generally parallel to the planes formed by the D-ring attachment plate and top plate, and the screw is generally vertical and generally perpendicular to the D-ring plate.

The D-ring plate may also feature a notch in each of two opposing edges. A D-ring 660 may comprise a first segment and a second segment. The first segment and second segment comprise elongated strips or bands that are generally parallel to each other. A first end of the first segment is joined to a first end of the second segment by a third segment. The third segment is an elongated strip or band that is generally perpendicular to the first segment and second segment. Together, the first segment, second segment, and third segment form a generally “D” shaped structure. The segments are sized to fit within and be retained by a side latch 530. The second end of the first segment and the second end of the second segment are inserted into the notches in D-ring plate and welded or otherwise suitably attached. The segments of D-ring 660 may be formed from a single rod that has been bent into a generally D-shaped configuration, or the segments may be cut from a metal plate or other suitable material.

All components of the stake pocket insert body and D-ring assembly may be constructed from stainless steel, another metal, or any other suitable material.

The stake pocket insert is fixed or confined within the stake pocket of the truck bed 10. The position of the D-ring assembly may be adjusted up and down relative to the stake pocket insert by rotating the D-ring assembly about the screw. Such vertical adjustment of the D-ring assembly allows adjustment of the seal compression of the hinged cover 1, keeping water, dust, and the like from entering the interior of the hinged cover 1 and truck bed 10. Adjustment by rotation about the single screw makes adjustment easy as adjustment can be performed with one hand from outside the stake pocket with a single motion. When installed, an additional cover plate may be positioned above the top plate, covering any openings and providing a flush appearance where only a portion of the D-shaped structure formed by first segment, second segment, and third segment of the D-ring assembly extend above the additional flush mounted plate. To adjust the D-ring assembly, the cover plate is removed, the D-ring assembly adjusted by rotation about the screw, and the cover plate replaced.

OTHER EMBODIMENTS

In one embodiment, a tent accessory may be attached to the opening formed between the front mount assembly 100, movable section 200, and truck bed 10.

In one embodiment, components of the hinged cover 1 may be shipped flat for assembly by an equipment dealer or an end user. This arrangement greatly reduces storage cost for a wholesaler or dealer, allows painted parts to be separated from the tubular frame structure to avoid damage to painted parts in shipping, and lowers shipping costs. In another embodiment, hinged cover 1 may be transported in multiple pieces. This allows for reduced storage for a dealer or wholesaler, lower shipping costs, and damaged pieces to be replaced individually.

In one embodiment, solar panels may be installed on one or more of the roof panels 210. When parked, the angle of the movable section 200 can be adjusted to optimize the energy absorption by the solar panels.

In an alternative embodiment, as shown in FIG. 33, the tubular subframe to which exterior panels such as section 120 and 220 are bonded can be replaced by a sheet metal panel or a combination of interior panels and tubes. This arrangement can almost eliminate all of the tubes. The benefit of this approach is the elimination of the complex coping of the tubes at the welded joints. It substantially reduces the amount of welding. It improves the thermal insulation value while also reducing the sound transfer through the walls.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A hinged cover for enclosing a bed of a pickup truck comprising:

a front mount assembly comprising a generally rectangular front panel, a generally triangular driver side panel extending rearwardly from a side of the generally rectangular front panel, and a generally triangular passenger side panel extending rearwardly from an opposite side of the generally rectangular front panel;

a first inner hinge plate mounted to the driver side panel and a second inner hinge plate mounted to the passenger side panel;

a movable section configured to cover the bed; and a first rod extending inwardly from the first inner hinge plate and a second rod extending inwardly from the second inner hinge plate, the first rod and second rod passing through a frame of the movable section, wherein the movable section is configured to rotate about the first rod and the second rod such that the movable section moves between an open position and a closed position.

2. The hinged cover of claim 1 wherein the movable section comprises the frame covered by a shell.

3. The hinged cover of claim 2 wherein the frame comprises a generally rectangular front frame section comprising a top frame segment and a bottom frame segment that are generally parallel to each other, a driver side frame segment connecting a first end of the top frame segment to a first end of the bottom frame segment, and a passenger side frame segment connecting a second end of the top frame segment to a second end of the bottom frame segment.

4. The hinged cover of claim 3 wherein the first rod and the second rod pass through a forward frame segment of the generally rectangular front frame section.

5. The hinged cover of claim 1 wherein the movable section comprises a plurality of connected hollow wall sections.

6. The hinged cover of claim 1 further comprising a first outer hinge plate mounted to the first inner hinge plate, and a second outer hinge plate mounted to the second inner hinge plate.

7. A hinged cover for enclosing a bed of a pickup truck comprising:

a front mount assembly mounted to the bed;

a movable section having a forward end and a back end and configured to cover the bed, wherein the movable section comprises a frame covered by a shell; and wherein the frame comprises a generally rectangular front frame section comprising a top frame segment and a bottom frame segment that are generally parallel to each other, a driver side frame segment connecting a first end of the top frame segment to a first end of the bottom frame segment, and a passenger side frame segment connecting a second end of the top frame segment to a second end of the bottom frame segment; and a first rod and a second rod affixed to the front mount assembly, the first rod and second rod extending through the generally rectangular front frame section at the forward end of the movable section such that the movable section is hingedly connected to the front mount assembly and such that the movable section may rotate about the first rod and the second rod between an open position and a closed position.

8. An adjustable concealed latch assembly for securing and opening a hinged cover for a pickup truck comprising:

a rear latch adjustably mounted to an interior side of a rear panel of the hinged cover;

a first side latch adjustably mounted to an interior side of a driver side panel and a second side latch adjustably mounted to an interior side of a passenger side panel; and a first cable connecting the rear latch to the first side latch and a second cable connecting the rear latch to the second side latch such that actuation of the rear latch causes the first and second side latches to open;

wherein the rear latch, first and second side latches, and first and second cables are concealed within an interior of the hinged cover.

9. The adjustable concealed latch assembly of claim 8 wherein the first side latch is mounted to the interior side of the driver side panel via a first mounting plate and the second side latch is mounted to the interior side of the passenger side panel via a second mounting plate.

10. The adjustable concealed latch assembly of claim 8 further comprising a first D-ring and a second D-ring, the first and second D-rings each mounted to a frame of the pickup truck.

11. The adjustable concealed latch assembly of claim 10 wherein the first side latch engages the first D-ring and the second side latch engages the second D-ring.

* * * * *